(12) United States Patent
Tani et al.

(10) Patent No.: US 11,717,904 B2
(45) Date of Patent: Aug. 8, 2023

(54) SENSOR DEVICE FOR WELDING

(71) Applicants: DAIHEN CORPORATION, Osaka (JP); KYOCERA CORPORATION, Kyoto (JP)

(72) Inventors: Nobuhiro Tani, Osaka (JP); Hirokazu Saito, Osaka (JP); Kengo Onishi, Ome (JP); Tomohiro Noguchi, Ome (JP); Daisuke Kanai, Ome (JP)

(73) Assignees: DAIHEN CORPORATION, Osaka (JP); KYOCERA CORPORATION, Kyoto (JP)

( * ) Notice: Subject to any disclaimer, the term of this patent is extended or adjusted under 35 U.S.C. 154(b) by 1001 days.

(21) Appl. No.: 16/493,213

(22) PCT Filed: Mar. 16, 2018

(86) PCT No.: PCT/JP2018/010455
§ 371 (c)(1),
(2) Date: Sep. 11, 2019

(87) PCT Pub. No.: WO2018/169049
PCT Pub. Date: Sep. 20, 2018

(65) Prior Publication Data
US 2020/0047274 A1    Feb. 13, 2020

(30) Foreign Application Priority Data

Mar. 17, 2017 (JP) .................. 2017-052974
Mar. 17, 2017 (JP) .................. 2017-053214

(51) Int. Cl.
*B23K 9/095* (2006.01)
*G01B 11/14* (2006.01)

(52) U.S. Cl.
CPC ............ *B23K 9/0956* (2013.01); *G01B 11/14* (2013.01)

(58) Field of Classification Search
CPC ...... B23K 26/032; B23K 31/00; B23K 9/095; B23K 9/0956; G01B 11/0608; G01B 11/14; G01B 11/24; G01B 21/047; G01B 5/0014
(Continued)

(56) References Cited

U.S. PATENT DOCUMENTS

| 4,497,996 A | 2/1985 | Libby, Jr. et al. | |
| 2012/0090816 A1* | 4/2012 | Bayazitoglu | F28F 21/02 219/121.72 |
| 2014/0079424 A1* | 3/2014 | Ikebuchi | G03G 15/2039 399/69 |

FOREIGN PATENT DOCUMENTS

| CN | 105720835 A | 6/2016 | |
| CN | 106270947 A * | 1/2017 | ........... B23K 9/1274 |

(Continued)

OTHER PUBLICATIONS

Office Action in China Application No. 201880018313.6, dated Nov. 19, 2020, 10 pages.
(Continued)

*Primary Examiner* — Nathaniel E Wiehe
*Assistant Examiner* — Ket D Dang
(74) *Attorney, Agent, or Firm* — Crowell & Moring LLP

(57) ABSTRACT

The durability and detection accuracy of a sensor unit may possibly decrease due to radiation heat generated from work pieces while they are welded together. A sensor device 1 includes a sensor unit 2, a housing case 3, and a shielding member 5. The sensor unit 2 is a device for measuring the shapes of the work pieces W or the distance to the work pieces W. The housing case 3 houses the sensor unit 2 and has formed therein a pass-through portion 36a for laser beam projection and a pass-through portion 36b for detection that pass a laser beam L1 from a laser beam projection unit 21 and a laser beam L2 directed to a detection unit 22, (Continued)

respectively. The shielding member 5 is attached to the housing case 3, and shields radiation heat directed toward the lower surface of the housing case 3 among radiation heat generated while the work pieces W are welded together. The shielding member 5 is made of a material with lower thermal conductivity than that of the housing case 3.

16 Claims, 18 Drawing Sheets

(58) Field of Classification Search
USPC .................................................. 219/124.34
See application file for complete search history.

(56) References Cited

FOREIGN PATENT DOCUMENTS

| CN | 106270947 A | | 1/2017 |
|---|---|---|---|
| DE | 2950657 A1 | | 6/1981 |
| JP | 2000-301339 A | | 10/2000 |
| JP | 2004-195502 A | | 7/2004 |
| JP | 2004195502 A | * | 7/2004 |
| JP | 2011-245517 A | | 12/2011 |
| JP | 2011245517 A | * | 12/2011 |
| KR | 2013-0012275 A | | 2/2013 |
| KR | 20130070874 A | * | 6/2013 |

OTHER PUBLICATIONS

Extended European Search Report in Europe Application No. 18767970.9 dated Dec. 22, 2020, 4 pages.

* cited by examiner

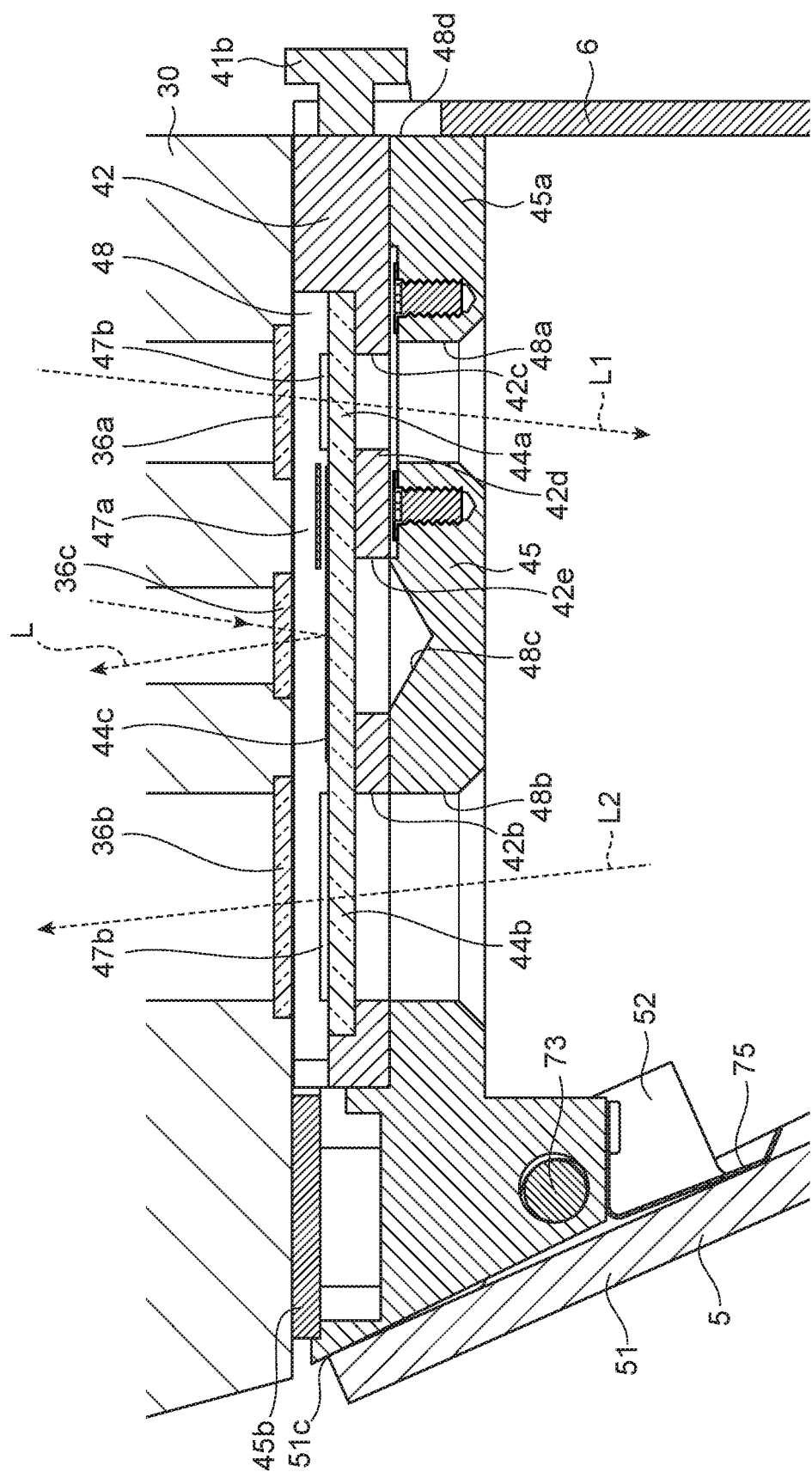

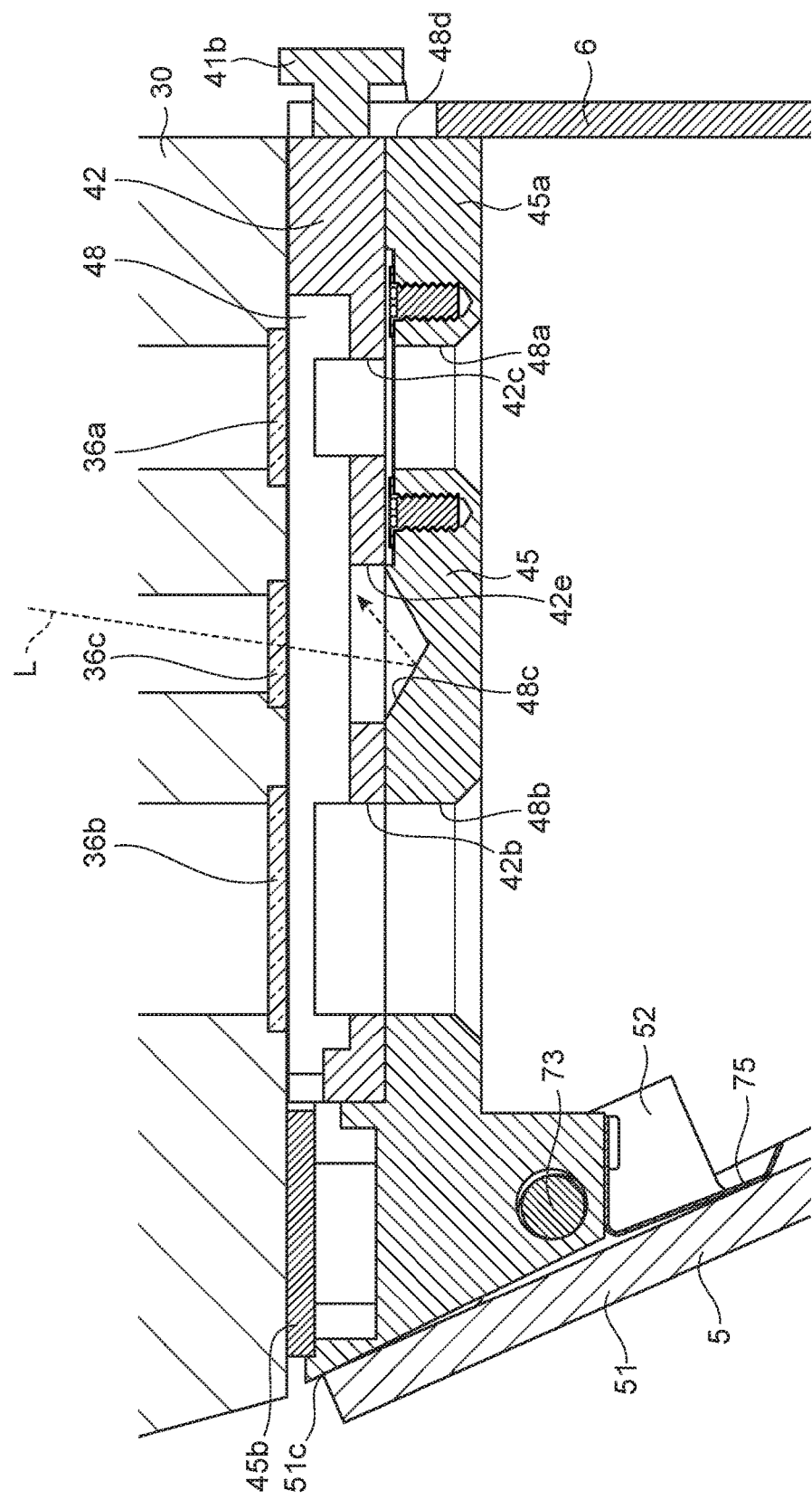

SENSOR DEVICE FOR WELDING

CROSS-REFERENCE TO RELATED APPLICATIONS

This application is a 371 application of PCT/JP2018/010455 having an international filing date of Mar. 16, 2018, which claims priority to JP2017-053214 filed Mar. 17, 2017 and JP2017-052974 filed Mar. 17, 2017, the entire content of each of which is incorporated herein by reference.

TECHNICAL FIELD

The present invention relates to a sensor device for welding that is suitably used for welding work pieces together.

BACKGROUND ART

Conventionally, when a pair of iron plates with grooves are welded together through butt welding using arc welding, for example, a welding torch is brought close to the work pieces (i.e., to the portions with grooves that are butted together). In such a state, a voltage is applied across the tip end of a welding wire fed from the welding torch and the work pieces so that an arc is generated between them. Thus, the welding wire is melted and the work pieces are also heated and melted so that the work pieces can be welded together.

When welding is performed, the distance between the welding torch and the work pieces or the shapes of the work pieces will influence the quality of the work pieces to be welded together. In view of such a point, Patent literature 1 proposes a sensor device for welding that measures the shapes of the work pieces, for example.

The sensor device for welding disclosed in Patent literature 1 includes a laser beam projection unit that projects a laser beam, and a detection unit that detects a laser beam reflected from the surfaces of work pieces, and measures the shapes of the work pieces from the detected laser beam. The laser beam projection unit and the detection unit are housed within a housing case (i.e., housing case) including a housing (i.e., case body) and a protective cover. The protective cover has formed thereon a shielding member for shielding sputter that is generated from the work pieces while they are welded together.

CITATION LIST

Patent Literature

Patent literature 1: JP 2004-195502 A

SUMMARY OF INVENTION

Technical Problem

Herein, according to the sensor device of Patent literature 1, sticking of sputter to the container from the welded portion can be reduced by the shielding member. However, according to such a sensor device, since the shielding member is formed integrally with the protective cover of the housing case and is made of the same material as that of the protective cover, radiation heat that is generated from the work pieces while they are welded together will be transferred to the entire protective cover from the shielding member, so that the heat is likely to be transferred to a sensor unit, which includes a laser beam projection unit and a detection unit, within the housing case. If the sensor unit is heated to a temperature above its heat resistant temperature due to the heat transferred thereto, the durability of the sensor unit cannot be secured, and further, the sensor unit as well as a component to which the sensor unit is attached will thermally expand. Therefore, the attached state of the sensor unit will change, which may make it difficult to secure the detection accuracy of the sensor unit.

The present invention has been made in view of the foregoing, and provides a sensor device for welding in which a sensor unit is less likely to be influenced by radiation heat that is generated from work pieces while they welded together.

Solution to Problem

The inventors have conducted concentrated studies and found that when a shielding plate is formed integrally with a housing case (or a protective cover thereof), the housing case (or the protective cover thereof) will be heated uniformly since the housing case and the shielding plate are made of the same material. Therefore, the inventors have found that providing a shielding member separately from the housing case and selecting a material that is unlikely to transfer heat input thereto as the material of the shielding member will be able to reduce the influence of radiation heat that is generated from work pieces while they are welded together on the sensor unit.

The present invention has been made based on the new finding of the inventors. A sensor device for welding according to the present invention is a sensor device for welding, including at least a sensor unit configured to measure the states of work pieces to be welded together or the distance to the work pieces, and a container including a housing case and a shielding member, the housing case being adapted to house the sensor unit, and the shielding member being adapted to shield radiation heat directed toward the housing case among radiation heat generated while the work pieces are welded together, in which the shielding member is made of a material with lower thermal conductivity than that of the housing case.

According to the present invention, since the shielding member is made of a material with lower thermal conductivity than that of the housing case, transfer of radiation heat, which is directed toward the shielding member, to the housing case can be reduced. In other words, in comparison with when the shielding member is made of the same material as that of the housing case (or each portion thereof), the shielding member of the present invention is less likely to have radiation heat input thereto (i.e., heat is less likely to be transferred to the inside of the shielding member). Therefore, the sensor unit within the housing case is less likely to be influenced by the radiation heat. Accordingly, the detection accuracy of the sensor unit can be secured. It should be noted that "the states of work pieces" as referred to in the present invention include the shapes of the work pieces before or after they are welded together, the molten state of a welded portion (i.e., molten pool), which has been melted, formed on the work pieces, and the shape of the welded portion, for example.

As a more preferable configuration, the shielding member is a shielding member attached to the housing case as a housing case, the shielding member has formed therein a planar portion and an attachment portion, the planar portion extending so as to shield the radiation heat, and the attachment portion being arranged on a rear face side of the planar portion that is opposite to the side where the work pieces are to be welded together and being adapted to attach the shielding member to the housing case, and the shielding member is attached on the rear face side of the planar portion to the housing case via the attachment portion.

According to such a configuration, since the attachment portion of the shielding member is attached to the housing case on the side opposite to the side where the work pieces are to be welded together, that is, on the rear face side of the planar portion of the shielding member, there is no possibility that the portion where the shielding member and the housing case are attached together will be exposed directly to radiation heat. Accordingly, the housing case is less likely to have radiation heat input thereto, and the sensor unit housed within the housing case is less likely to be heated.

Herein, the planar portion of the shielding member and the housing case may be in contact with each other in a state in which the shielding member is attached to the housing case. However, as a more preferable configuration, a gap is formed between the planar portion of the shielding member and the housing case in a state in which the shielding member is attached to the housing case. According to such a configuration, a space between the planar portion of the shielding member and the housing case is heat-insulated due to the gap formed between the planar portion of the shielding member and the housing case. Accordingly, radiation heat that is input to the shielding member becomes less likely to be transferred to the housing case from the shielding member, and the sensor unit housed within the housing case becomes less likely to be heated.

As described above, the attachment structure is not particularly limited as long as the attachment portion of the shielding member is attached to the housing case on the rear face side of the planar portion of the shielding member. However, as a more preferable configuration, provided that the attachment portion of the shielding member is a first attachment portion, the housing case has a second attachment portion on the rear face side of the planar portion, the second attachment portion being adapted to attach the shielding member to the housing case, each of the first attachment portion and the second attachment portion has a through-hole through which an attachment shaft is adapted to be inserted, and the shielding member is attached to the housing case as the shaft is inserted through the through-holes of the attachment portions and the through-hole of the housing case.

According to the present embodiment, as the shielding member is attached to the housing case with the shaft inserted through the through-hole of each attachment portion and the through-hole of the housing case, the shaft can be easily inserted through the through-holes from a lateral face side of the housing case. In addition, since radiation heat that is input to the shielding member is partially transferred to the housing case via the shaft, the radiation heat that is input to the shielding member becomes less likely to be transferred to the housing case from the shielding member, and the sensor unit housed within the housing case becomes less likely to be heated.

As a more preferable configuration of a case where the attachment shaft is used, a gap is formed between the shaft and at least one of the through-hole of the first attachment portion or the through-hole of the second attachment portion. According to such a configuration, since a gap is formed between the shaft and at least one of the through-hole of the first through-hole or the through-hole of the second attachment portion, the area of contact with the shaft can be reduced, and heat from the shielding member can be radiated through the gap. In particular, if a gap is formed on the side where the work pieces are to be welded together, a space in which the gap is formed functions as a heat-insulating space so that transfer of heat from the shielding member to the housing case can be even more reduced.

The aforementioned gap formed between the housing case and the shielding member may be formed in a state in which the shielding member is fixed to the housing case, and the structure for forming the gap is not particularly limited. However, as a more preferable configuration, the housing case has attached thereto an elastic member, which is adapted to urge the shielding member toward the side where the work pieces are to be welded together, in a state in which the shielding member is attached to the housing case, and the gap is formed between the housing case and the planar portion of the shielding member in a state in which the shielding member is urged by the elastic member.

According to such a configuration, the gap is formed between the housing case and the planar portion of the shielding member as the shielding member is urged by the elastic member. Therefore, even after an external force acts on the shielding member, for example, the gap can be formed stably due to the restoring force (i.e., urging force) of the elastic member.

In particular, when the gap is formed between the shaft and at least one of the through-hole of the first attachment portion or the through-hole of the second attachment portion, the position of the gap between the shaft and the through-hole can be retained stably.

As a more preferable configuration, the material of the shielding member is not particularly limited as long as the thermal conductivity of the material is lower than that of the housing case. However, more preferably, the shielding member is made of a ceramic material. Since the ceramic material has higher heat resistance and lower thermal conductivity than those of other materials, heat can be favorably shielded by the shielding member.

Since a ceramic material is a brittle material, the shielding member is likely to have defects, such as fractures, generated therein when subjected to an impact load, for example. However, when an elastic member is provided, the elastic member functions as a shock absorbing member for the shielding member. Therefore, damage to the shielding member can be suppressed.

As a further preferable configuration, the sensor unit includes at least a detection unit configured to detect as a detection light beam a light beam from surfaces of the work pieces to be welded together, the housing case includes a case body adapted to house the sensor unit, the case body having formed therein at least one pass-through portion that passes the detection light beam directed toward the detection unit, and a protective cover including a protective plate that transmits the detection light beam, the protective cover being attached to the case body such that the protective plate covers the pass-through portion, and the shielding member is attached to the protective cover.

According to such a configuration, since the pass-through portion is covered with the protective plate of the protective cover, entry of fume and the like, which are generated during welding, into the case body through the pass-through portion can be suppressed. Further, since the shielding member is attached to the case body via the protective cover, there is no possibility that heat of the shielding member will be transferred directly to the case body. Accordingly, a temperature rise of the sensor unit housed within the case body can be reduced.

Herein, as described above, the state in which a gap is formed between the planar portion of the shielding member and the housing case may be any of a state in which the planar portion of the shielding member and the housing case are totally without contact with each other or a state in which they are partly in contact with each other. However, as a more preferable configuration, in a state in which the shielding member is attached to the housing case, the gap is formed between the planar portion of the shielding member and the protective cover, and an end of the planar portion on a side away from the work pieces is in contact with the protective cover, the protective cover has formed therein a gas flow channel that passes a gas, and the gas flow channel has formed therein a plurality of fins extending in one direction.

According to such a configuration, since an end of the planar portion on the side away from the work pieces is in contact with the protective cover while the aforementioned gap is secured, the shielding member can be stably attached to the housing case, and heat is less likely to be transferred to the protective cover from the shielding member. In addition, heat transferred to the protective cover from the shielding member is radiated by the fins formed in the gas flow channel, and the heat radiated by the fins is released with a gas flowing through the gas flow channel. Consequently, the temperature of the protective cover is less likely to increase and the sensor unit is less likely to be heated.

Further, the direction of a gas flowing through the gas flow channel and the direction in which the fins are formed are not particularly limited as long as the protective cover can be cooled. However, as a more preferable configuration, provided that a surface of the protective cover on the side where the work pieces are to be welded together with respect to the sensor device for welding is a front face of the protective cover, and a surface opposite to the front face is a rear face of the protective cover, the end of the planar portion abuts the front face of the protective cover, the gas flow channel is formed such that a gas flows from the front face side to the rear face side of the protective cover, and the fins extend from the front face side to the rear face side of the protective cover.

According to such a configuration, since the gas flow channel is formed such that a gas flows from the front face side to the rear face side of the protective cover, heat from an end of the planar portion in contact with the front face of the protective cover can be radiated efficiently. Further, since the fins formed in the gas flow channel extend from the front face side of the protective cover at which the temperature is higher to the rear face side at which the temperature is lower, heat transferred to the fins can be radiated efficiently.

As a more preferable configuration, a spacer is arranged between the case body and the protective cover, and a material of the spacer has lower thermal conductivity than those of the case body and the protective cover. According to such a configuration, since the spacer is also made of a material with low thermal conductivity, heat transferred to the case body from the protective cover via the spacer can be reduced.

As a more preferable configuration, the sensor unit includes at least a detection unit, the detection unit being configured to detect as a detection light beam a light beam from surfaces of the work pieces to be welded together, the sensor unit being configured to measure states of the work pieces or a distance from the detection unit to the work pieces using the detection light beam detected with the detection unit, the sensor device for welding further includes a case body adapted to house the sensor unit, the case body having formed therein at least one pass-through portion that passes the detection light beam directed toward the detection unit, and a protective cover including a protective plate that transmits the detection light beam, the protective cover being attached to the case body such that the protective plate covers the pass-through portion, the protective cover includes a cartridge and a holder, the cartridge including the protective plate, and the holder being adapted to hold the cartridge and be attached to the case body, and the cartridge detachably engages the holder in a state in which the holder is attached to the case body.

According to such a configuration, since the protective cover is attached to the case body so that the pass-through portion is covered with the protective plate that transmits a detection light beam, the pass-through portion can be protected by the protective plate. Herein, the protective plate is included in the cartridge, and the cartridge detachably engages the holder attached to the case body and thus is held therein. Therefore, detaching the cartridge, which has been attached to the case body, can easily replace the protective plate together with the cartridge and thus can improve the maintenance property of the device.

Herein, the engagement structure is not particularly limited as long as the cartridge detachably engages the holder. However, as a more preferable configuration, provided that a surface of the protective cover on a side where a welding device for welding the work pieces together is arranged with respect to the sensor device for welding is a front face of the protective cover, and a surface opposite to the front face is a rear face of the protective cover, the cartridge engages the holder so as to be able to be pulled out of the holder by being slid on the holder from the front face side toward the rear face side of the protective cover while being held on the holder.

According to such a configuration, the cartridge can be slid on the holder from the front face side toward the rear face side, which is less likely to be heated during welding, of the protective cover. Therefore, the cartridge can be quickly pulled out of the holder from the rear face side at which the temperature is lower than those of the other portions during welding so as to replace the protective cover without caring about heat that remains after the welding.

Herein, the cartridge may detachably engage a housing recess formed in at least one of the holder or the case body. However, as a more preferable configuration, in a state in which the holder is attached to the case body, a housing recess adapted to house the cartridge is formed between the holder and the case body, and the housing recess has on the rear face side an insertion slot through which the cartridge is adapted to be inserted.

According to such a configuration, even when the cartridge gets caught within the housing recess when being pulled out of the device, detaching the holder of the protective cover from the case body will allow the cartridge to be exposed and thus allow the cartridge to be easily detached. Further, it is possible to check if the cartridge is inserted in the housing recess from the rear face side where the insertion slot is formed.

By the way, since the protective plate transmits a laser beam, it is difficult to check if the protective plate is present in the cartridge. From such an aspect, as a more preferable configuration, the cartridge includes a cartridge body adapted to hold the protective plate, and the protective plate has formed therein a visible portion for visually checking if the protective plate is present in a state in which the protective plate is held in the cartridge body.

According to such a configuration, since the protective plate has a visible portion formed therein, if the protective plate is held in the cartridge body can be easily checked. Accordingly, an operator can be prevented from failing to put the protective plate in the cartridge body.

Further, as a preferable configuration, the case body has arranged therein a plate detection sensor, the plate detection sensor being configured to detect the protective plate in a state in which the cartridge is held in the holder. Accordingly, even when the protective plate cannot be attached to the cartridge body, and the cartridge is held in the holder attached to the case body, the plate detection sensor can check that the protective plate is not present in the cartridge.

In addition, as a more preferable configuration of the plate detection sensor, the visible portion is preferably a portion of the protective plate covered with a metallic material, and the plate detection sensor is preferably a sensor configured to detect the visible portion.

According to such a configuration, since the visible portion formed in the protective plate is made of a metallic material, the presence of the plate can be visually checked. Further, the visible portion functions as a detection portion for detecting the presence of the protective plate. Accordingly, since the visible portion has two functions including visual check and detection, the device configuration can be simplified.

The aforementioned plate detection sensor may be a sensor that uses a laser beam, electromagnetic waves, or ultrasonic waves, for example. However, more preferably, the plate detection sensor is a sensor configured to detect if the protective plate is present by irradiating the visible portion with a detection laser beam and detecting the detection laser beam reflected from the visible portion, the cartridge body has formed therein a through-hole, the through-hole being adapted to pass the detection laser beam emitted by the plate detection sensor in a state in which the protective plate is not held in the cartridge body, and being formed at a position covered with the visible portion in a state in which the protective plate is held in the cartridge body, and the holder has an antireflective portion, the antireflective portion being adapted to prevent the detection laser beam having passed through the through-hole from being reflected toward the plate detection sensor.

According to such a configuration, when the cartridge body is attached to the sensor device for welding together with the protective plate, the visible portion of the protective plate is irradiated with a detection laser beam from the plate detection sensor, and the detection laser beam reflected from the visible portion is reflected toward the plate detection sensor. Accordingly, the plate detection sensor can determine that the protective plate is present.

Meanwhile, when the cartridge body is not attached to the sensor device for welding, a detection laser beam from the plate detection sensor irradiates an antireflective portion of the holder, but the antireflective portion does not reflect the detection laser beam toward the plate detection sensor. Accordingly, the plate detection sensor can determine that the protective plate is not present. Similarly, when the protective plate is not held in the cartridge body, a detection laser beam from the plate detection sensor passes through the through-hole of the cartridge and irradiates the antireflective portion of the holder, but the antireflective portion does not reflect the detection laser beam toward the plate detection sensor. Accordingly, the plate detection sensor can determine that the protective plate is not present. In this manner, since the protective plate can be determined to be absent using a single antireflective portion regardless of whether the cartridge body is attached to the sensor device for welding or not, the device configuration can be simplified more.

Advantageous Effects of Invention

According to the present invention, a shielding member with lower thermal conductivity than that of the housing case is provided. Thus, radiation heat that is generated from work pieces while they are welded together is less likely to be transferred to the sensor unit housed within the housing case via the shielding member.

BRIEF DESCRIPTION OF DRAWINGS

FIG. 16A is a schematic cross-sectional view in the direction of the arrows along line A-A of FIG. 15.

FIG. 16C is a cross-sectional view of the sensor device for welding illustrated in FIG. 16A in a state in which the protective cover is not attached to the cartridge.

DESCRIPTION OF EMBODIMENTS

Hereinafter, a sensor device for welding (hereinafter referred to as a "sensor device") according to an embodiment of the present invention will be described with reference to FIGS. 1 to 16C.

1. Attached State of Sensor Device 1 and Overall Configuration of Sensor Device 1

Figure 1:
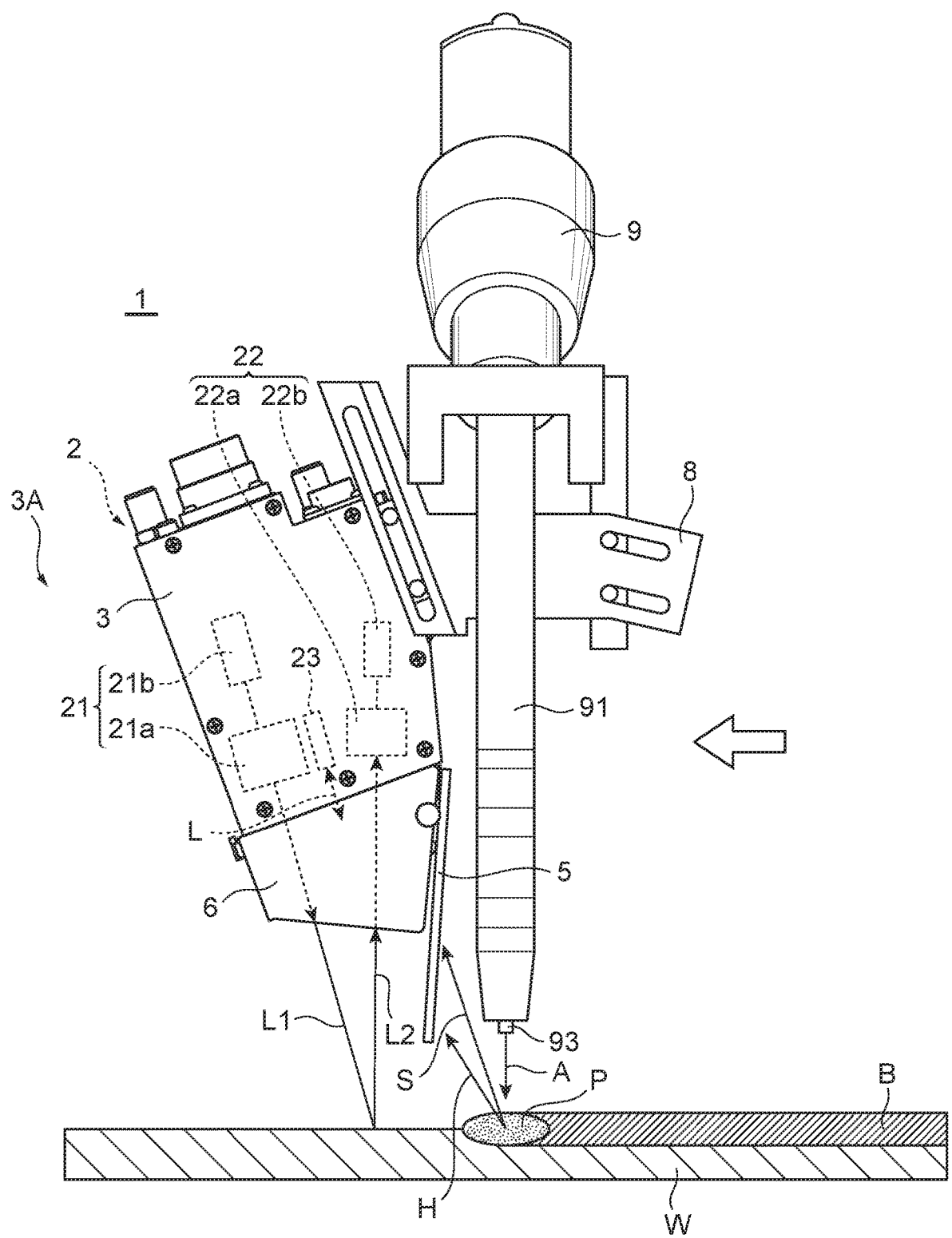
FIG. 1 is a schematic side view of a sensor device for welding, in a state attached to a welding device according to an embodiment of the present invention.

As illustrated in FIG. 1, the sensor device 1 according to the present embodiment is attached to a welding device 9 via an attachment jig 8. A welding torch 91 of the welding device 9 is supplied with a welding wire 93 and a voltage is applied across the tip end of the welding wire 93, which is fed from the welding torch 91, and work pieces W during welding so that an arc A is generated between them. Accordingly, the welding wire 93 and the work pieces W are melted and a molten pool P is generated on the work pieces W and thus, the work pieces W can be welded together. The welding device 9 is moved in the direction of the arrow indicated in FIG. 1 while the molten pool P is formed on the work pieces W so that a welded portion (i.e., bead) B is formed between the work pieces W. FIG. 1 depicts a single work piece as the work pieces W for the purpose of convenience, but in practice, two or more work pieces are welded together through butt welding, fillet welding, or lap welding, for example, and the welding method is not particularly limited. Further, although the present embodiment specifically illustrates an example in which work pieces are welded together through arc welding using a welding wire, other welding methods, such as TIG welding, electron beam welding, laser beam welding, or gas welding, can also be used.

To stably weld the work pieces W together using the welding device 9, it is important to measure the distance between the welding torch 91 and the work pieces W or the shapes of the work pieces W. Thus, in the present embodiment, the shapes of the work pieces W or the distance to the work pieces W is measured using the sensor device 1, for example.

As illustrated in FIG. 1, the sensor device (i.e., sensor head) 1 according to the present embodiment includes a sensor unit 2 and a container 3A housing the sensor unit 2. In the present embodiment, the container 3A includes a housing case 3 with a protective cover 40 attached thereto, a shielding member 5 attached to the housing case 3, and a guide member (i.e., guide portion) 6. In the present embodiment, the housing case 3, the shielding member 5, and the guide member 6 are separable members, but may also be of an integrated structure. In addition, the guide member 6 of the container 3A may be omitted as appropriate.

2. Regarding Sensor Unit 2

The sensor unit 2 is a device for measuring the shapes of the work pieces W or the distance to the work pieces W (from the sensor unit 2) from a detected laser beam (i.e., detected light beam) L2. In the present embodiment, the sensor unit 2 includes, for example, a laser beam projection unit 21 that projects a laser beam L1 onto the surfaces of the work pieces W to be welded together, and a detection unit 22 that detects a laser beam L2 reflected from the surfaces of the work pieces. The laser beam projection unit 21 includes a laser beam source 21b that generates a laser beam, and a projection device (optics) 21a that projects the laser beam L1 generated by the laser beam source 21b onto the work pieces W.

The detection unit 22 includes a photodetector device (optics) 22a that receives a laser beam L2, which is generated as the laser beam L1 projected by the projection device 21a is reflected from the surfaces of the work pieces W, and a detection device 22b that detects the laser beam L2 sent from the photodetector device 22a. The photodetector device 22a sends the received laser beam L2 to the detection device 22b, and the detection device 22b, which is an imaging device (i.e., camera), for example, detects the laser beam L2 and sends data on the detected laser beam L2 to an image processing device (not illustrated) outside or inside of the sensor device. The image processing device measures the shapes (or states) of the work pieces W or the distance from the sensor unit 2 (specifically, from the laser beam source 21b) to the work pieces W, and then calculates the distance between the welding torch 91 and the work pieces W from the measured distance, for example.

Although the present embodiment illustrates the sensor unit 2 including the laser beam projection unit 21 and the detection unit 22 as an exemplary sensor unit, it is also possible to provide a separate laser beam projection unit outside of the sensor device 1 for welding and omit the laser beam projection unit 21 in the sensor unit 2. In such a case, the sensor device 1 for welding does not include the laser beam projection unit 21. Therefore, each portion used for laser beam projection described below (e.g., a pass-through portion 36a for laser beam projection of a case body 30 and a protective portion 44a for laser beam projection of a protective plate 44 described below) can be omitted.

In the present embodiment, although the sensor unit 2 uses the laser beams L1 and L2 to measure the states (i.e., shapes) of the work pieces W or the distance from the detection unit 22 to the work pieces W, it is also possible to detect, as a detection light beam, a light beam, which has been generated from the molten pool P on the work pieces W during welding, or a light beam, which has been reflected into the work pieces W from an external light source or the like, without using the laser beams, for example. In such a case also, the laser beam projection unit 21 in the sensor unit 2 illustrated in the present embodiment may be omitted, and it is acceptable as long as the detection unit includes at least a photodetector device (i.e., optics) that receives a detection light beam directed toward the surfaces of the work pieces W, and an imaging device (i.e., camera) that detects the detection light beam sent from the photodetector device. Since the sensor device 1 for welding does not include the laser beam projection unit 21, each portion used for laser beam projection described below can be omitted. Data on the detection light beam is sent to the image processing device (not illustrated) outside or inside of the sensor device so that the states of the work pieces W (e.g., the molten state of the molten pool P) can be measured. A voltage applied across the tip end of the welding wire 93 fed from the welding torch 91 and the work pieces W during welding may be controlled on the basis of the measured states of the work pieces W. Alternatively, the sensor unit may measure the states of the work pieces W to be welded together or the distance to the work pieces W using ultrasonic waves or electromagnetic waves.

Further, the case body has arranged therein a plate detection sensor 23 that detects the protective plate 44 in a state in which a cartridge 41 of the protective cover 40 described below is held in the holder 45. The plate detection sensor 23 may be any sensor that uses ultrasonic waves, a laser beam, or electromagnetic waves, for example, as long as it can detect the presence of the protective plate 44 as described below. In the present embodiment, the plate detection sensor 23 is a sensor that detects the presence or absence of the protective plate 44 by emitting a detection laser beam L, and detecting, if the protective plate 44 is present, the detection laser beam L reflected from the protective plate 44. It should be noted that the principle of detecting the target protective plate 44 using the detection laser beam L from the plate detection sensor 23 is commonly known, and thus, the detailed description thereof is omitted herein.

3. Regarding Housing Case 3

Figure 4:
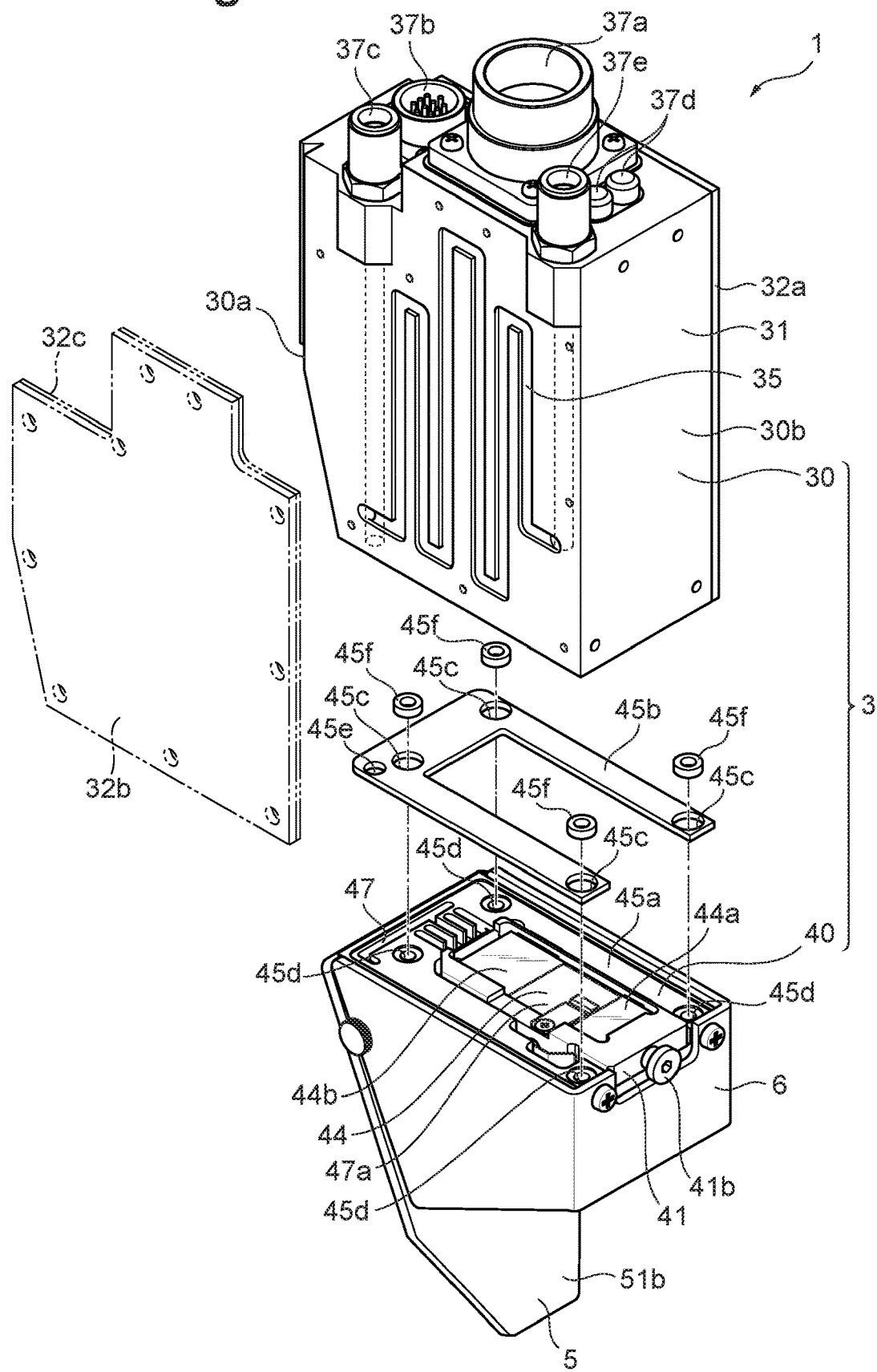
FIG. 4 is a schematic exploded perspective view of the sensor device for welding illustrated in FIG. 3 with a cover of a case body removed.
Figure 5:
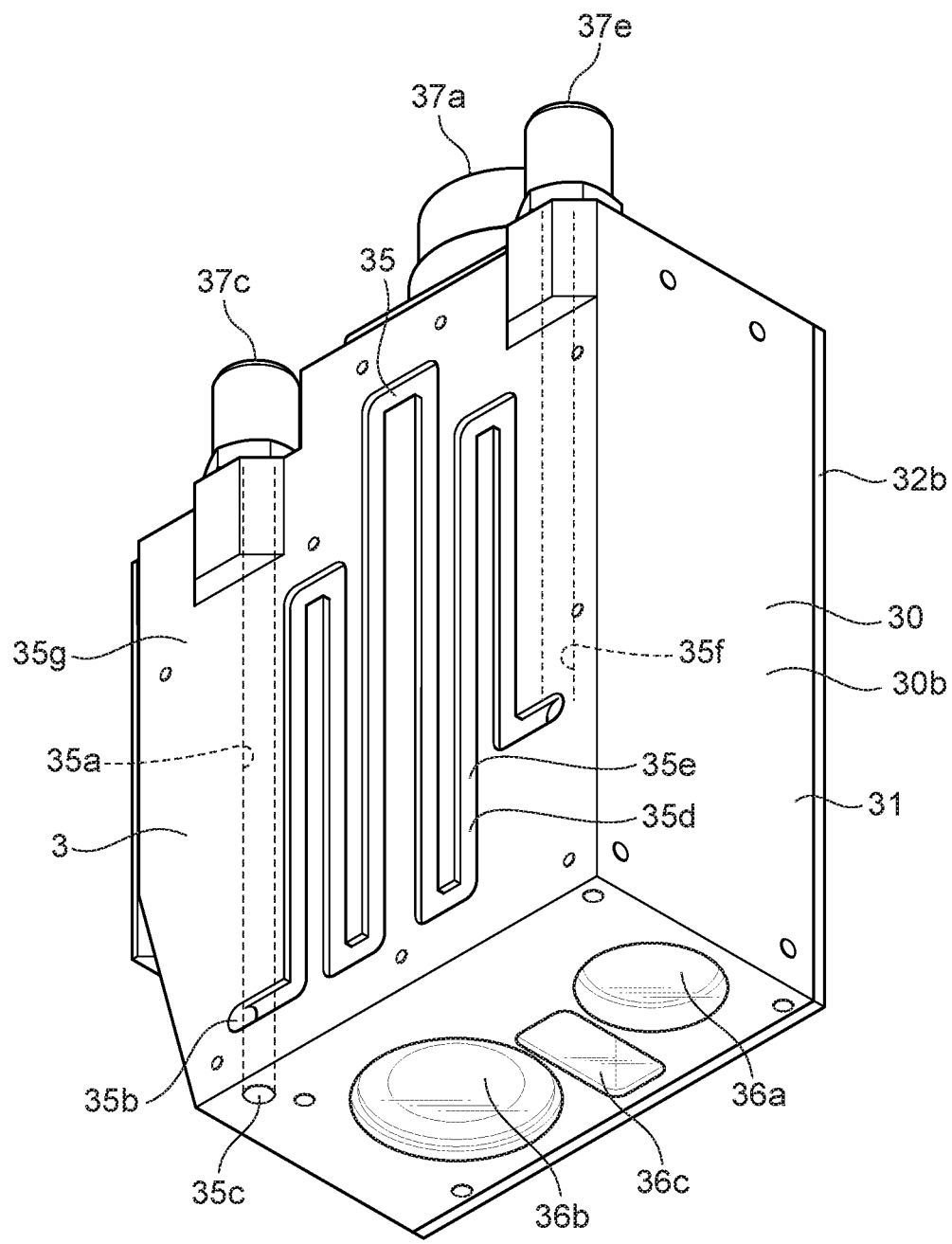
FIG. 5 is a schematic perspective view of the case body of the sensor device for welding illustrated in FIG. 4 seen from the bottom side.

The housing case 3 houses the sensor unit 2 and has formed therein pass-through portions (specifically, see a pass-through portion 36a for laser beam projection and a pass-through portion 36b for detection in FIG. 5) that pass the laser beam L1 emitted from the laser beam projection unit 21 and the laser beam L2 directed toward the detection unit 22, respectively. The pass-through portions may be openings, for example, as long as they can transmit the laser beams L1 and L2, respectively, and the openings may be covered with materials (e.g., transparent resin or glass) that can transmit the laser beams L1 and L2, respectively. In the present embodiment, the housing case 3 includes the case body 30 and the protective cover 40 (see FIG. 4).

3-1. Regarding Case Body 30

Figure 2:
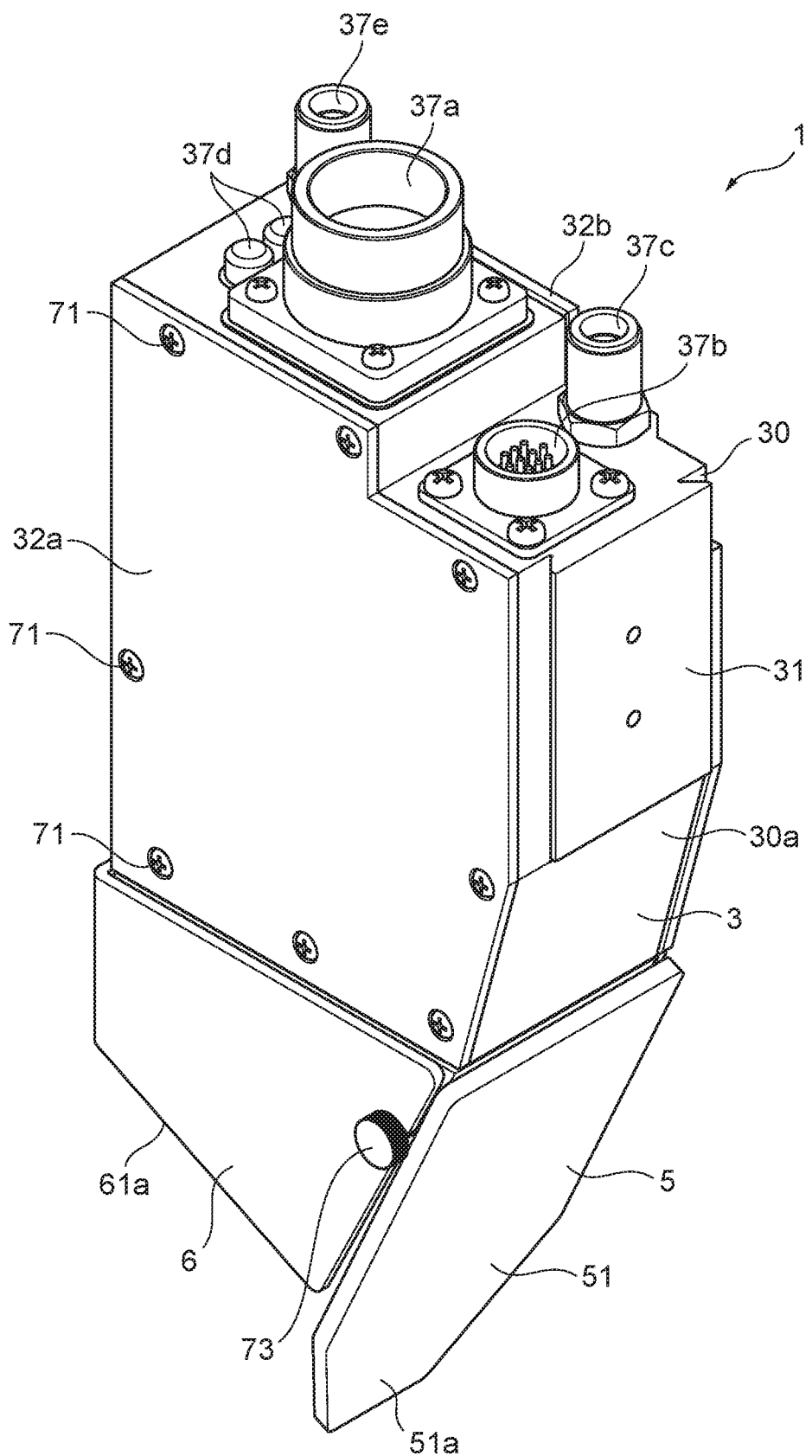
FIG. 2 is a schematic perspective view of the sensor device for welding illustrated in FIG. 1 seen from one side thereof.
Figure 3:
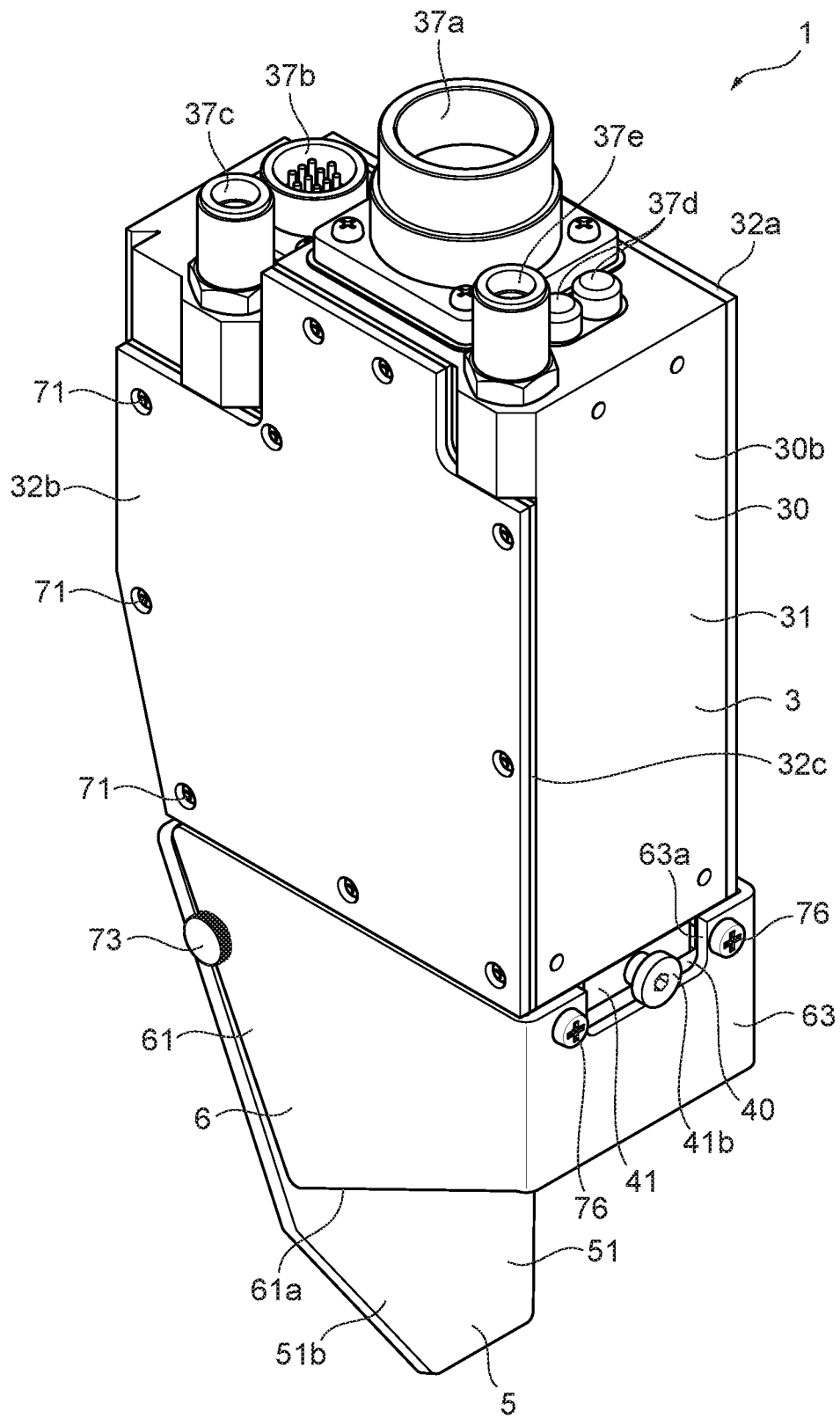
FIG. 3 is a schematic perspective view of the sensor device for welding illustrated in FIG. 1 seen from the other side thereof.

In the present embodiment, the case body 30 is an assembly for housing the sensor unit 2. As illustrated in FIGS. 2 and 3, the case body 30 includes a chassis 31, which has a recess (not illustrated) for housing the sensor unit 2, and covers 32a and 32b attached to the opposite sides of the chassis 31 with fasteners 71, such as screws. The cover 32a on one side is adapted to cover the recess in which the aforementioned sensor unit 2 is housed. As illustrated in FIGS. 4 and 5, the cover 32b on the other side covers the chassis 31 via a sealing member 32c so as to form a first gas flow channel 35 with a serpentine shape in the case body 30. As a gas is supplied to the first gas flow channel 35, the sensor unit 2 within the case body 30 is cooled and thus, a temperature rise of the sensor unit 2 during welding can be reduced. It should be noted that FIGS. 4 and 5 illustrate the case body 30 with the cover 32b removed.

Herein, examples of a gas supplied to the first gas flow channel 35 include air (atmosphere), helium gas, argon gas, nitrogen gas, carbon dioxide gas, and a mixed gas thereof. Preferably, a gas that can cool the sensor device 1 for welding during welding and is chemically stable with respect to the portions of the work pieces W to be welded together is used. For example, a gas from a source of supply of a shielding gas for welding (not illustrated) may be used.

Specifically, in the present embodiment, the first gas flow channel 35 includes a first cooling flow channel 35a that is formed in a region of from a gas supply port 37c described below to the inside of the case body 30 on its front face 30a side (i.e., inside a wall portion forming the front face 30a). The first gas flow channel 35 communicates with a second cooling flow channel 35d that branches off the first cooling flow channel 35a at a branch port 35b. The second cooling flow channel 35d is formed by covering a groove portion 35e, which is formed on a side face 35g of the chassis 31, with the cover 32b with a sealing member 32c interposed therebetween. It should be noted that the first cooling flow channel 35a communicates with a second gas flow channel 47 at a communication port 35c of the case body 30. Further, the second cooling flow channel 35d communicates with a third cooling flow channel 35f formed inside a wall portion forming a rear face 30b of the case body 30, and the third cooling flow channel 35f communicates with a gas discharge port 37e. Supplying a gas for cooling to the first gas flow channel 35 can cool the sensor unit 2 within the case body 30 and reduce a temperature rise of the sensor unit 2 during welding.

The upper face of the case body 30 is provided with a connecting terminal 37a for outputting detected signals from the sensor unit 2, for example, and a connecting terminal 37b for supplying power to the sensor unit 2 and receiving control signals for the sensor unit 2, for example. Further, the upper face of the case body 30 is provided with the gas supply port 37c for supplying a gas to the first gas flow channel 35 and to the protective cover 40, and the gas discharge port 37e for discharging a gas from the first gas flow channel 35. Besides, a lamp 37d that displays the ON or OFF state of a power supply for the sensor unit 2 is also provided.

As illustrated in FIG. 5, the case body 30 housing the sensor unit 2 has formed therein, as pass-through portions, a pass-through portion 36a for laser beam projection that passes the laser beam L1 from the laser beam projection unit 21, and a pass-through portion 36b for detection that passes the laser beam L2 directed toward the detection unit 22. It should be noted that in FIG. 5, the case body 30 also has formed therein a detection pass-through portion 36c for a sensor (not illustrated) to check if the cartridge 41 described below is present or absent. Specifically, the case body 30 includes the plate detection sensor 23 (see FIG. 1) for checking if the cartridge 41 is present or absent, and also has the pass-through portion 36c that passes a detection laser beam from the plate detection sensor 23. In the present embodiment, the pass-through portion 36a for laser beam projection and the pass-through portion 36b for detection are formed individually in the case body 30, but they may be formed continuously as long as the detection accuracy of the sensor unit 2 can be secured. In the present embodiment, the pass-through portion 36a for laser beam projection and the pass-through portion 36b for detection are portions where circular plates, which transmit the laser beams L1 and L2, respectively, are arranged within circular openings.

3-2. Regarding Protective Cover 40

The protective cover 40 partially forms the housing case 3, and includes the protective plate 44. The protective cover 40 is attached to the case body 30 from its bottom side with fasteners 72, such as screws, so that the pass-through portion 36a for laser beam projection and the pass-through portion 36b for detection are covered with the protective plate 44 (e.g., see FIGS. 4, 5, 7, and 9). More specifically, the protective cover 40 includes the cartridge 41 including the protective plate 44, and a holder 45 detachably holding the cartridge 41. The holder 45 is attached to the case body 30 from its bottom side with the fasteners 72 (see FIGS. 7, 9, and 12).

The protective cover 40 has a front face 40a formed at a position facing the shielding member 5, a rear face 40b formed on the side opposite to the front face 40a, and a pair of lateral side faces 40c and 40c continuous with the front face 40a and the rear face 40b. The cartridge 41 is detachable from the holder 45 from the rear face 40b side of the protective cover 40 (For example, see FIGS. 4 and 6).

The holder 45 of the protective cover 40 includes a holder body 45a and a sealing member 45b. The holder body 45a has formed therein the second gas flow channel 47 (i.e., gas flow channel) so that a gas can flow through a portion between the protective cover 40 and the case body 30 from the first gas flow channel 35 formed in the case body 30.

As illustrated in FIG. 4, the sealing member 45b (i.e., first spacer) is arranged between the case body 30 and the protective cover 40. The sealing member 45b is a member that prevents leakage of a gas flowing through the second gas flow channel 47 of the holder body 45a, and is made of a flexible, compressively deformable sheet material, such as rubber or resin. The sealing member 45b is preferably made of a material with lower thermal conductivity than those of the case body 30 and the protective cover 40. Accordingly, arranging the sealing member 45b can reduce the amount of heat that is transferred directly to the case body 30 from the protective cover 40.

Further, the holder body 45a and the sealing member 45b have formed therein through-holes 45c and 45d. A ring-shaped spacer 4f is inserted through each of the through-holes 45c and 45d. The spacer 4f is arranged so as to be seated around a portion of the holder body 45a where each through-hole 45d is formed. As described above, as four spacers 4f are seated in the through-holes 45d of the holder body 45a and are further inserted through the through-holes 45c of the sealing member 45b, the sealing member 45b can be arranged at a proper position. This can avoid degradation of the sealing property of the second gas flow channel 47 formed between the protective cover 40 and the case body 30 due to positional deviations of the sealing member 45b between them.

The holder 45 is attached to the case body 30 with the fasteners 72, such as bolts, inserted through the spacers 45f. In addition, the sealing member 45b has formed therein a communication hole 45e to allow a gas to flow through the second gas flow channel 47 formed in the holder body 45a from the first gas flow channel 35 formed in the case body 30.

Figure 7:
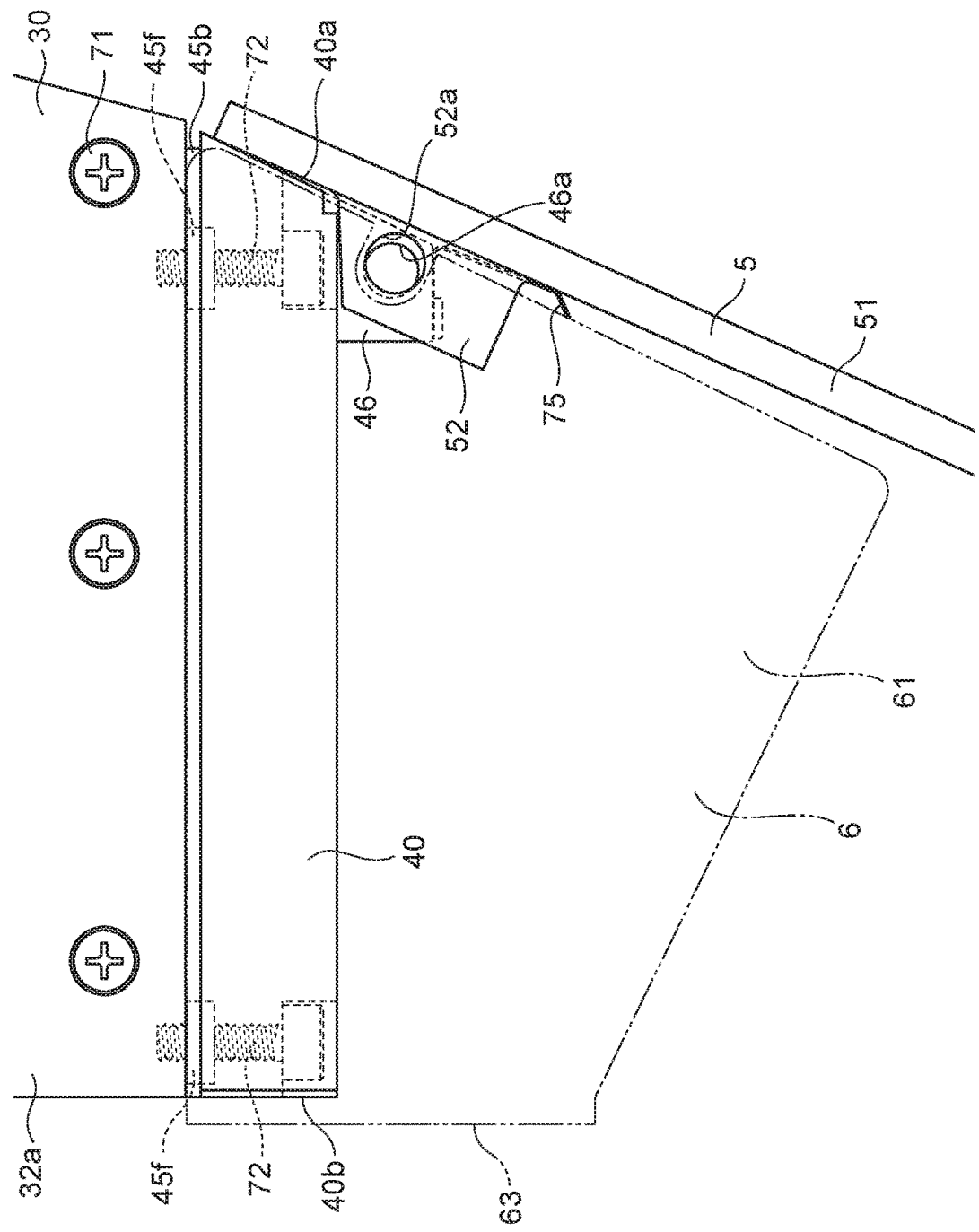
FIG. 7 is an enlarged side view of the sensor device for welding illustrated in FIG. 2 with a guide member removed.

FIG. 7 illustrates a state in which the guide member 6 and the cartridge 41 are removed from the sensor device 1. Herein, each spacer 45f is arranged between the case body 30 and the protective cover 40 together with the sealing member 45b. When the holder 45 and the case body 30 are attached together with four fasteners 72, the sealing member 45b is compressively deformed between them. If the fastening degrees of the four fasteners 72 (i.e., fastening degrees of screws) differ, the sealing property of the sealing member 45b would degrade.

Therefore, in the present embodiment, each spacer 4f is made of a material with a higher modulus of longitudinal elasticity (i.e., that is less easily deformed) than that of the sealing member 45b, and each spacer 4f is more preferably arranged such that it is recessed from the surface of the sealing member 45b in a state in which the spacer 45f is arranged in the case body 30. Accordingly, when the holder body 45a of the protective cover 40 is attached to the case body 30 with four fasteners 72, the sealing member 45b is compressively deformed in the thickness direction until the spacer 4f recessed from the surface of the sealing member 45b abuts the case body 30. Consequently, the sealing member 45b can be compressively deformed uniformly and the sealing property of the sealing member 45b can be increased.

Further, each spacer 4f is preferably made of a material with lower thermal conductivity than those of the case body 30 and the protective cover 40. For example, when each of the case body 30 and the protective cover 40 is made of a metallic material, such as aluminum or stainless steel, each spacer 4f is made of a metallic material, resin material, or ceramic material with lower thermal conductivity than that of the metallic material. When each spacer 4f is made of a ceramic material, examples of the ceramic material include alumina, yttria, silicon carbide, silicon nitride, zirconia, cordierite, cermet, steadite, mullite, aluminum nitride, and sapphire. In particular, when a ceramic material is used, the modulus of longitudinal elasticity of the each spacer 45f is higher than that of the sealing member 45b, which is more preferable.

As described above, when a material with lower thermal conductivity than those of the protective cover 40 and the case body 30 is selected for each of the materials of the spacer 45f and the sealing member 45b between the protective cover 40 and the case body 30, heat is less likely to be transferred to the case body 30 from the protective cover 40.

It should be noted that a "spacer" as referred to in the present invention means both the spacer 45f and the sealing member 45b.

Figure 6:
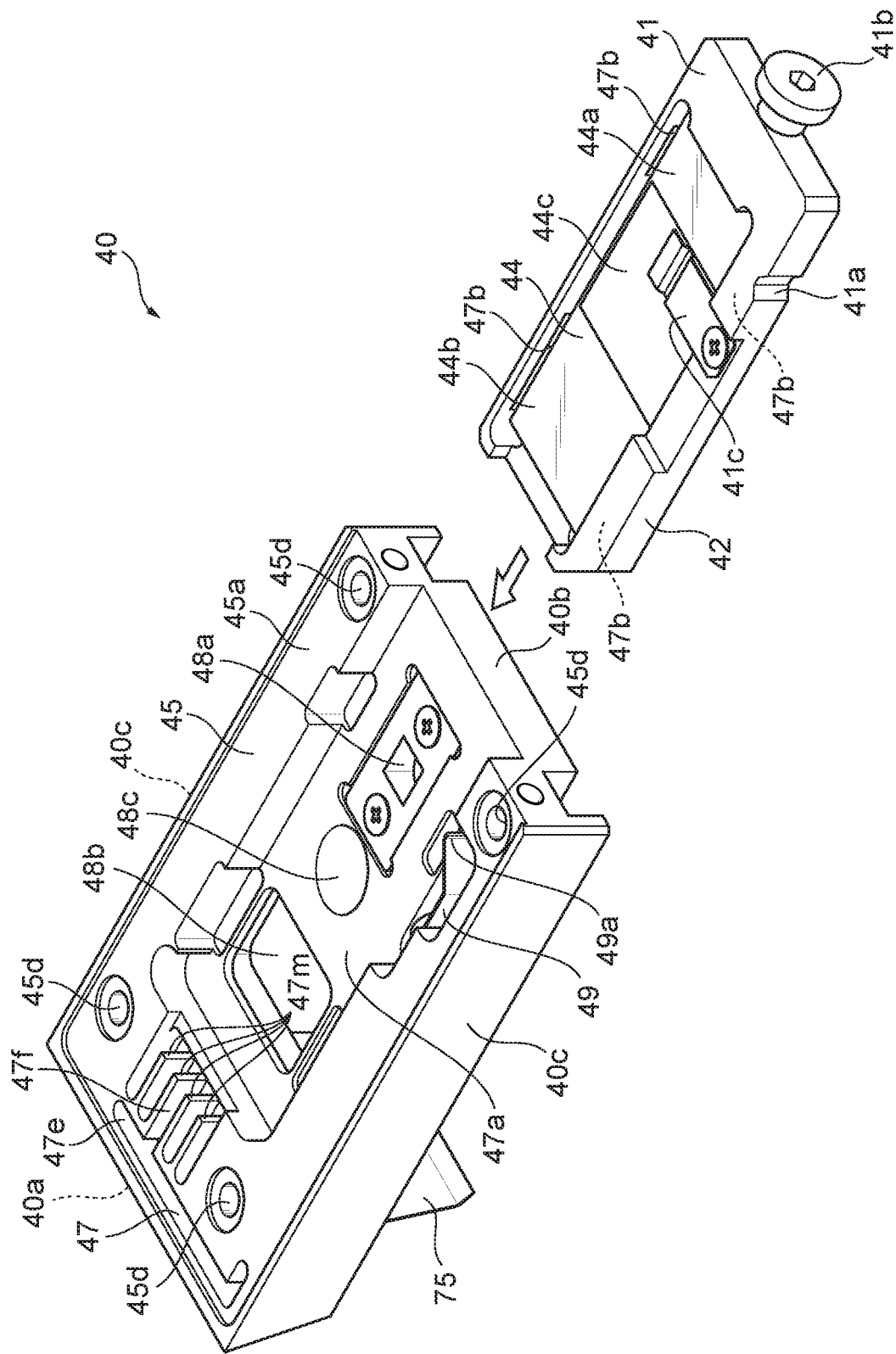
FIG. 6 is an exploded perspective view of the protective cover illustrated in FIG. 4.

As illustrated in FIG. 6, the holder 45 has attached thereto a leaf spring 49 that is bent so as to form a projection 49a, and the projection 49a of the leaf spring 49 engages a recess 41a of the cartridge 41 so that the cartridge 41 can be held in the holder 45. Meanwhile, when the cartridge 41 is pulled out of the holder 45 with a gripper 41b of the cartridge 41 being gripped, the leaf spring 49 elastically deforms. Therefore, the recess 41a of the cartridge 41 and the projection 49a of the leaf spring 49 can be easily disengaged.

The cartridge 41 includes the protective plate 44, and the protective plate 44 is detachably held in the cartridge body 42 by a clip 41c. The protective plate 44 is preferably made of a transparent material that transmits the laser beams L1 and L2, and examples of such material include glass and resin. The protective plate 44 includes a protective portion 44a for laser beam projection that covers the pass-through portion 36a for laser beam projection, a protective portion 44b for detection that covers the pass-through portion 36b for detection, and a cover portion (visible portion) 44c having formed thereon a metal film, such as aluminum foil, between the protective portion 44a for laser beam projection and the protective portion 44b for detection. With the cover portion (visible portion) 44c provided, it is possible to easily check if the protective plate 44 is arranged in the cartridge 41.

In the present embodiment, in a state in which the cartridge 41 is loaded, the pass-through portion 36a for laser beam projection and the pass-through portion 36b for detection of the case body 30 are covered with the protective portion 44a for laser beam projection and the protective portion 44b for detection of the protective plate 44, respectively. This can suppress entry of fume and the like, which are generated during welding, into the pass-through portion 36a for laser beam projection and the pass-through portion 36b for detection.

Further, gases that have passed through slits 47b from an accumulator 47a, which is formed as a part of the second gas flow channel 47 within the protective cover 40, are blown to the protective portion 44a for laser beam projection and the protective portion 44b for detection from the irradiation side of the laser beam L1. Accordingly, sticking of foreign matter to the protective portion 44a for laser beam projection and the protective portion 44b for detection can be reduced. It should be noted that the accumulator 47a is a space formed as the cartridge 41 and the case body 30 are partially in contact with each other.

Herein, as illustrated in FIG. 6, the second gas flow channel 47 has formed therein a cooling flow channel 47e extending along the front face 40a of the protective cover 40. The cooling flow channel 47e communicates with an introduction flow channel 47f, and a gas flows into the accumulator 47a from the introduction flow channel 47f. The accumulator 47a has formed therein a plurality of fins 47m extending in one direction. In the present embodiment, as a more preferable configuration, the second gas flow channel 47 forming the introduction flow channel 47f to the accumulator 47a is formed such that a gas flows from the front face 40a side to the rear face 40b side of the protective cover 40, and the fins 47m extend in the accumulator 47a from the front face 40a side toward the rear face 40b side.

Further, the second gas flow channel 47 of the holder 45 has formed therein outlet ports for discharging gases, which have flowed through the second gas flow channel 47, to the side on which the laser beam L1 is projected. In the present embodiment, the outlet ports include, in a state in which the cartridge 41 is loaded into the holder 45, the outlet port 48a for laser beam projection through which a gas, which has been blown to the protective portion 44a for laser beam projection, is discharged, and the outlet port 48b for detection through which a gas, which has been blown to the protective portion 44b for detection, is discharged.

Herein, the cross-section of the flow channel of the outlet port 48b for detection through which a gas flows is larger than that of the outlet port 48a for laser beam projection through which a gas flows. The outlet port 48b for detection is formed closer to the shielding member 5 described below than is the outlet port 48a for laser beam projection (see FIG. 12). Accordingly, a larger amount of gas flowing through the outlet port 48b for detection can be blown to the shielding member 5, and thus, the shielding member 5 can be efficiently cooled from its rear face 51b side.

4. Regarding Gas Flow Channel

As described above, in the present embodiment, as illustrated in FIG. 4, the case body 30 has formed therein the first gas flow channel 35 that passes a gas for cooling the sensor unit 2. The protective cover 40 has formed therein the second gas flow channel 47 that communicates with the first gas flow channel 35 and passes a gas so that the gas is discharged toward the work pieces W (i.e., downward) from around the protective plate 44. The case body 30 has the gas supply port 37c that supplies a gas to the first gas flow channel 35, and the gas discharge port 37e that discharges the gas supplied to the first gas flow channel 35 to the outside of the sensor device 1 for welding from the case body 30.

The gas supplied from the gas supply port 37c of the case body 30 flows through the first gas flow channel 35, and thus can cool the sensor unit 2 housed within the case body 30 during welding. In addition, since the second gas flow channel 47 communicates with the first gas flow channel 35, the supplied gas also flows through the second gas flow channel 47, and is discharged from around the protective plate 44. Accordingly, fume and the like, which are generated during welding, can be prevented from flowing toward the protective plate 44.

The second gas flow channel 47 communicating with the first gas flow channel 35 is formed between the protective cover 40 and the case body 30, and is formed such that a gas flows from the front face 40a side to the rear face 40b side of the protective cover 40. A gas that has flowed into the second gas flow channel 47 from the first gas flow channel 35 can effectively cool the front face 40a side, which is more likely to be heated during welding, of the protective cover 40. The gas heated with the heat from the front face 40a of the protective cover 40 flows toward the rear face 40b of the protective cover 40 and is discharged from around the protective plate 44. Accordingly, a temperature rise of the protective cover 40 during welding can be suppressed.

The second gas flow channel 47 has formed therein the accumulator 47a on the downstream side of the cooling flow channel 47e. The accumulator 47a is formed between the protective cover 40 and the case body 30 as described above. Forming the accumulator 47a can stabilize the pressure of a gas within the second gas flow channel 47 in the space formed between the cartridge 41 and the case body 30.

As illustrated in FIG. 6 and FIG. 16A described below, the accumulator 47a has formed therein the slits (i.e., vent holes) 47b through which gases are flowed out toward the protective plate 44 from the side on which a laser beam is projected. Accordingly, gases having flowed out through the slits 47b can be blown to the protective plate 44 at a stable pressure by the accumulator 47a. This can stably suppress sticking of foreign matter, such as dust, to the protective plate 44. Further, since gases having flowed out through the slits 47b can be discharged at a stable pressure by the accumulator 47a, variations in the measurement accuracy of the sensor unit 2 can be suppressed.

The slits 47b are formed on the opposite sides of the accumulator 47a with the protective plate 44 sandwiched therebetween, between the protective plate 44 and the cartridge body (i.e., holding member) 42. Specifically, the slits 47b are formed at positions sandwiching the protective portion 44a for laser beam projection of the protective plate 44 and at positions sandwiching the protective portion 44b for detection of the protective plate 44. In this manner, providing the pair of slits 47b and 47b on the opposite sides of the accumulator 47a with the protective plate 44 sandwiched therebetween allows gases to be uniformly blown to each of the protective portion 44a for laser beam projection and the protective portion 44b for detection from its opposite sides.

5. Regarding Shielding Member 5

Figure 8:
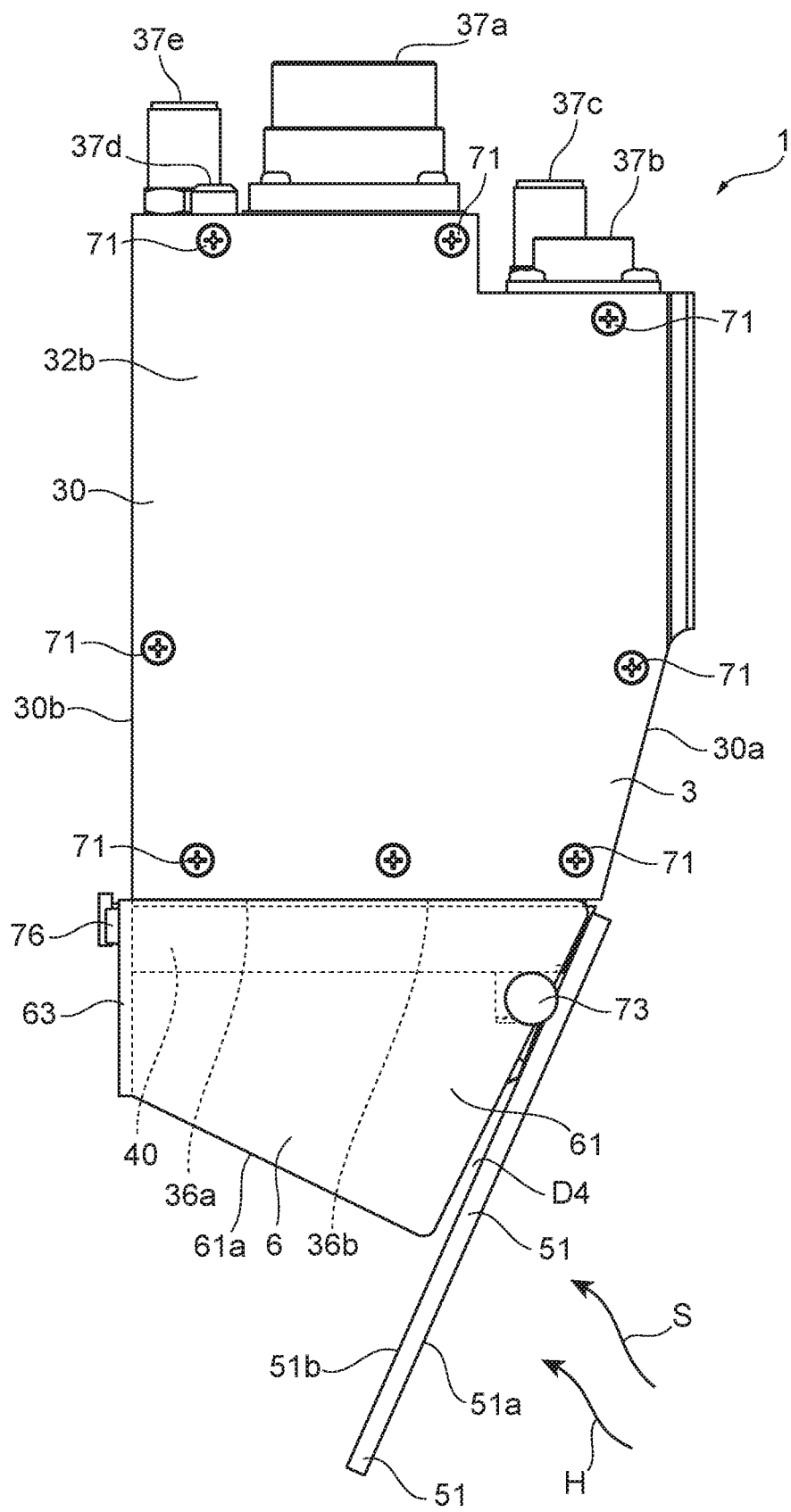
FIG. 8 is a schematic side view of the sensor device for welding illustrated in FIG. 1.

As illustrated in FIG. 8, the shielding member 5 that partially forms the sensor device 1 shields, among radiation heat generated while the work pieces W are welded together, radiation heat H directed toward the lower surface of the housing case 3 (specifically, on a side where the pass-through portion 36a for laser beam projection and the pass-through portion 36b for detection are formed). The shielding member 5 shields sputter S scattered from the molten pool P toward the lower surface of the housing case 3.

Herein, the shielding member 5 is made of a material with lower thermal conductivity than that of the material of the housing case 3. In the present embodiment, the shielding member 5 is made of a material with lower thermal conductivity than those of the case body 30 and the protective cover 40 excluding the protective plate 44 of the housing case. In the present embodiment, when each of the case body 30 and the protective cover 40 is made of a metallic material, the shielding member 5 is preferably made of a non-metallic material, such as a resin material or a ceramic material, with lower thermal conductivity than that of the metallic material.

The shielding member 5 is preferably made of a material with a heat resistant temperature greater than or equal to 700° C. (i.e., at least the melting point), or more preferably, a material whose mechanical strength will not easily decrease even at a temperature greater than or equal to 700° C. In the present embodiment, further preferably, each of the case body 30 and the protective cover 40 is preferably made of a metallic material, such as aluminum or stainless steel, and the shielding member 5 is made of a ceramic material. Examples of a ceramic material for forming the shielding member 5 include alumina, yttria, silicon carbide, silicon nitride, zirconia, cordierite, cermet, steadite, mullite, aluminum nitride, and sapphire.

Since the shielding member 5 is made of a material with lower thermal conductivity than that of the housing case 3, transfer of radiation heat, which is directed to the shielding member 5, to the housing case 3 can be reduced. In other words, in comparison with when the shielding member 5 is made of the same material as those of the case body 30 of the housing case 3 and the protective cover 40, the shielding member 5 is less likely to have radiation heat input thereto (i.e., heat is less likely to be transferred to the inside of the shielding member 5). Therefore, since the sensor unit 2 within the housing case 3 is less likely to be influenced by the radiation heat, the detection accuracy of the sensor unit 2 can be secured.

Figure 9:
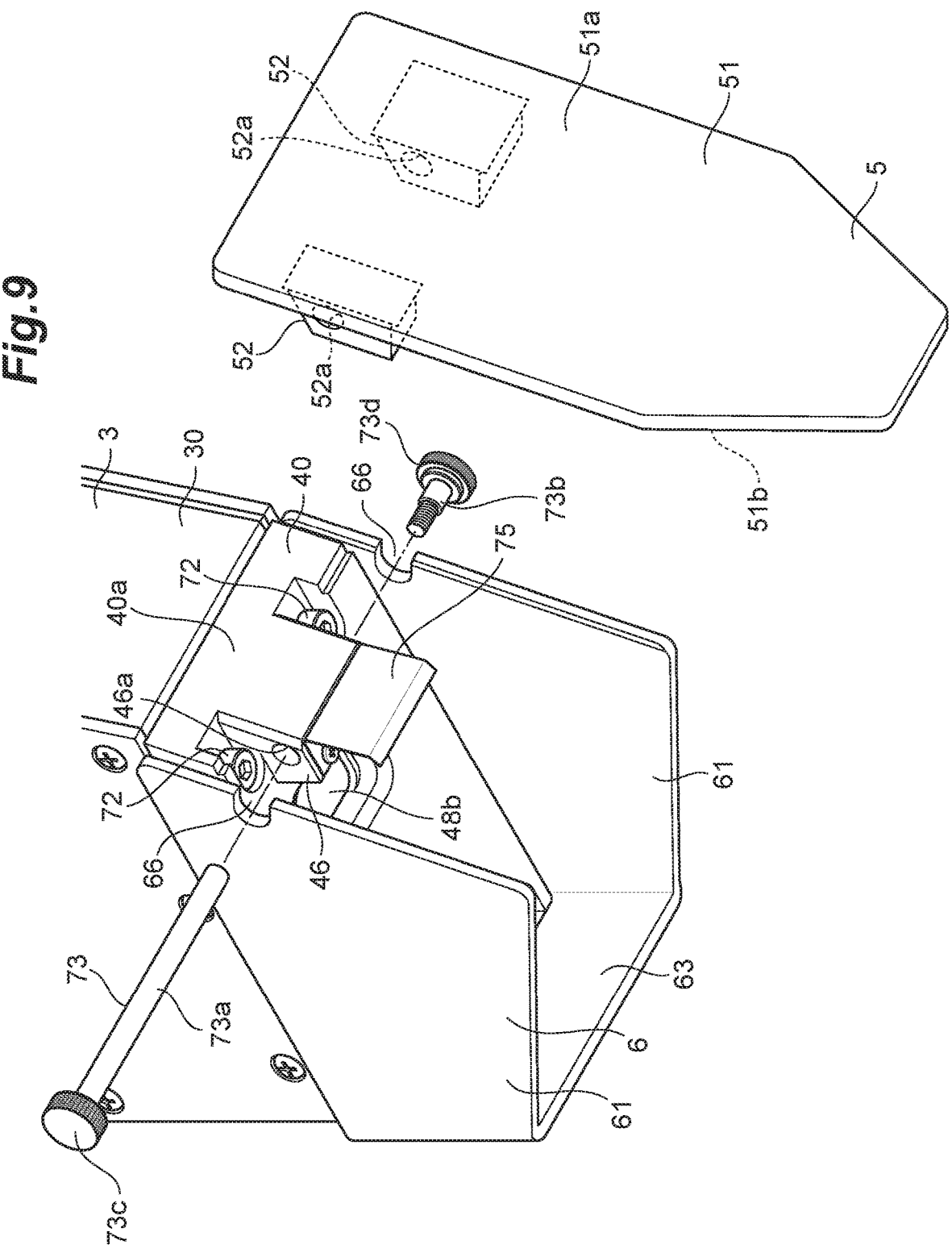
FIG. 9 is an exploded perspective view of a shielding member of the sensor device for welding illustrated in FIG. 1.
Figure 10:
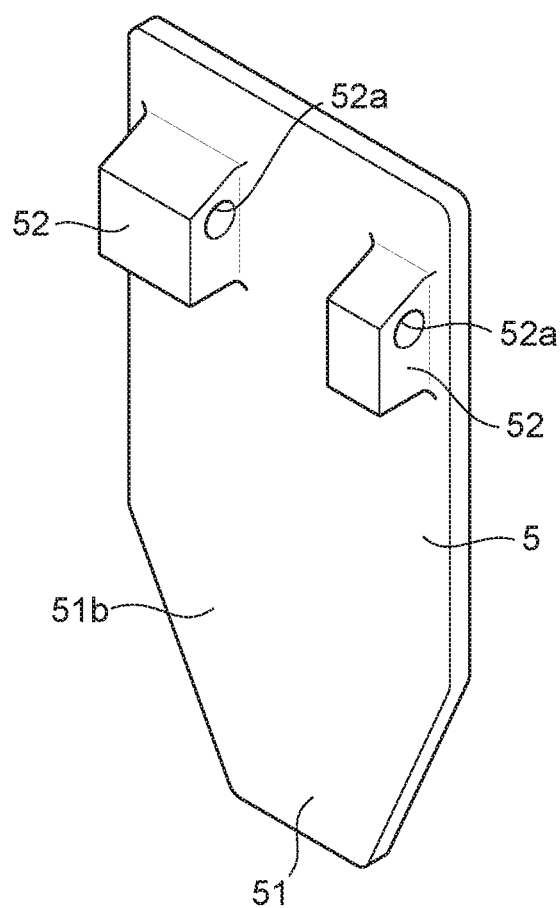
FIG. 10 is a schematic perspective view of the shielding member illustrated in FIG. 9 seen from its rear face side.

As illustrated in FIGS. 9 and 10, the shielding member 5 has formed therein a planar portion 51, which shields radiation heat generated during welding, and two first attachment portions 52 and 52 for attaching the shielding member 5 to the housing case 3. The planar portion 51 extends so as to shield (in the direction to shield) radiation heat generated during welding. Although the shape of the planar portion 51 is flat in the present embodiment, it may also be a curved shape that bulges or is recessed on the rear face 51b side of the planar portion 51, and the shape is not particularly limited as long as it can shield radiation heat. Each first attachment portion 52 is formed on the rear face 51b of the planar portion 51 on the side opposite to the front face 51a side where the work pieces W are to be welded together.

More preferably, the shielding member 5 is attached to the housing case 3 via the first attachment portions 52 and 52 on the rear face 51b side of the planar portion 51. Accordingly, there is no possibility that the portion where the shielding member 5 and the housing case 3 are attached together will be exposed directly to radiation heat. Consequently, radiation heat is unlikely to be input directly to the protective cover 40 from the attached portion to which heat is easily input, and thus, the sensor unit 2 housed within the case body 30 is unlikely to be heated. The shielding member 5 may also be attached to the protective cover 40 as in the present embodiment. Since the shielding member 5 is attached to the case body 30 via the protective cover 40, there is no possibility that heat of the shielding member 5 will be transferred directly to the case body 30. Accordingly, a temperature rise of the sensor unit 2 housed within the case body 30 during welding can be suppressed.

Further, the protective cover 40 (specifically, the holder 45) of the housing case 3 has formed thereon a second attachment portion 46 for attaching the shielding member 5 to the protective cover 40 on the rear face 51b side of the planar portion 51. In a state in which the shielding member 5 is attached to the protective cover 40, the second attachment portion 46 is arranged between the two first attachment portions 52 and 52 of the shielding member 5.

Each first attachment portion 52 of the shielding member 5 and the second attachment portion 46 of the protective cover 40 have formed therein through-holes 52a and 46a, respectively, for passing an attachment shaft 73 along the direction in which the planar portion 51 of the shielding member 5 extends (specifically, the lateral direction of the sensor device 1). The shaft 73 is made of a metallic material or a ceramic material, for example.

The shielding member 5 is attached to the protective cover 40 of the housing case 3 as the shaft 73 is inserted through the through-holes 52a of the pair of first attachment portions 52 and the through-hole 46a of the second attachment portion 46 formed between them. The shaft 73 includes a shaft body 73a and a screw body 73b screwably attached thereto. After the shaft body 73a is inserted through the through-holes 52a and 46a from a lateral face side of the housing case 3 (or the protective cover 40), the screw body 73b is screwed into the shaft body 73a so that the shielding member 5 can be attached to the protective cover 40.

In the present embodiment, the guide member 6 described below can be sandwiched between the shaft body 73a and heads 73c and 73d of the screw body 73b from the opposite sides thereof. Herein, the size and shape of the shielding member 5 may be determined so that the heads 73c and 73d of the shaft 73 are hidden at least partially or preferably entirely by the shielding member 5 as seen from the side where the work pieces W are to be welded together. Accordingly, the influence of radiation heat on the shaft 73 can be reduced.

In this manner, radiation heat that is input to the shielding member 5 is partially transferred to the protective cover 40 of the housing case 3 via the shaft 73. Accordingly, radiation heat that is input to the shielding member 5 becomes less likely to be transferred to the housing case 3 from the shielding member 5, and thus, the sensor unit 2 housed within the housing case 3 becomes less likely to be heated.

Figure 11:
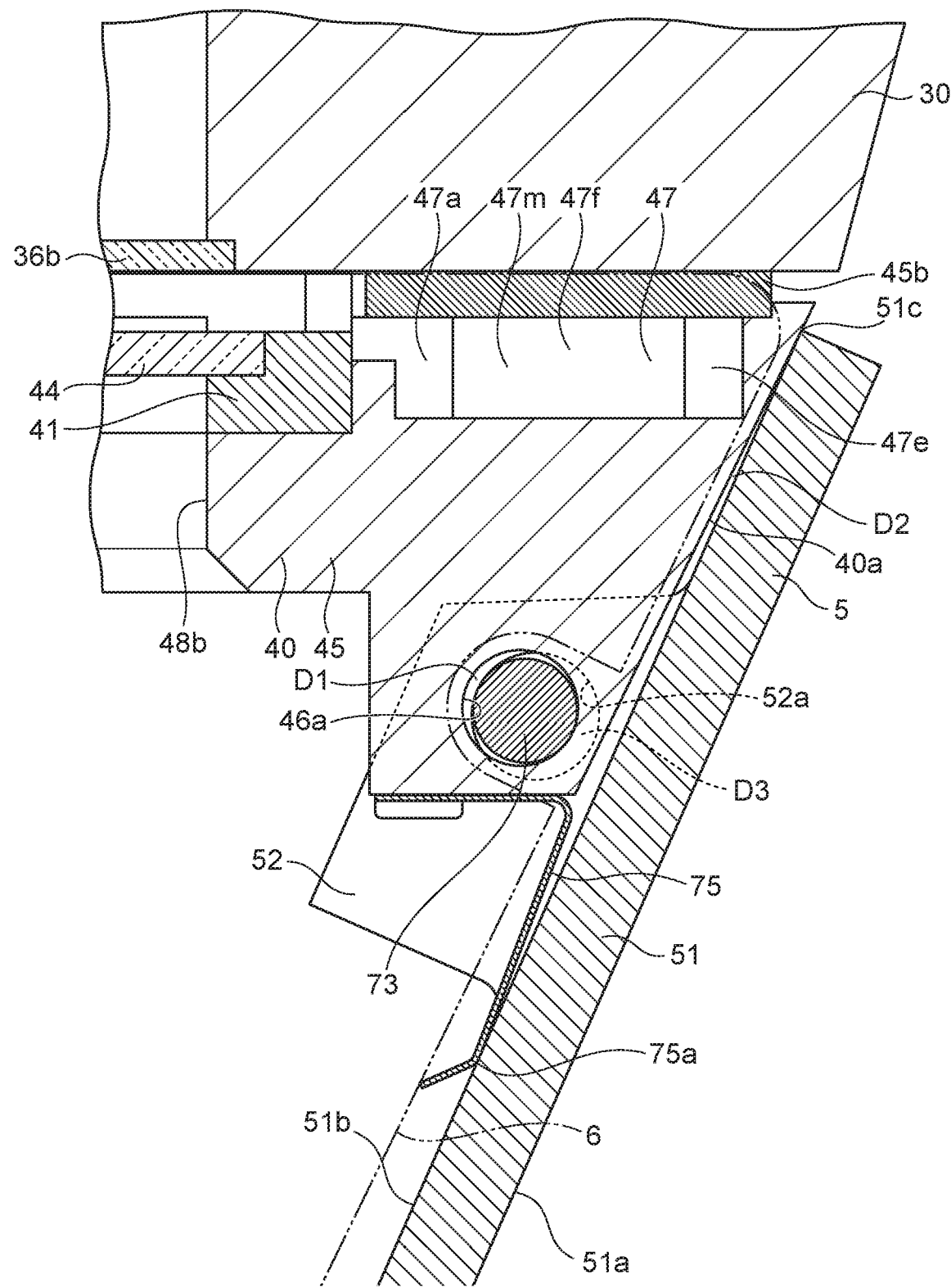
FIG. 11 is a cross-sectional view illustrating the attached state of the shielding member illustrated in FIG. 9.

As illustrated in FIG. 11, gaps D1 and D3 are formed between the shaft 73 (or the shaft body 73a thereof) and the through-holes 52a and 46a of the first and second attachment portions 52 and 46. Specifically, the diameter of the shaft body 73a of the shaft 73 is smaller than that of each of the through-holes 52a and 46a, and thus allowing the gaps D1 and D3 to be formed.

Providing a gap D2 can reduce the area of contact between the shaft 73 and the first and second attachment portions 52 and 46, and heat from the shielding member 5 can be radiated through the gaps D1 and D3. In particular, as illustrated in FIG. 11, if the gap D3 is formed between the shaft 73 and the second attachment portion 46 of the shielding member 5 on the side where the work pieces W are to be welded together, a space in which the gap D3 is formed functions as a heat-insulating space. Accordingly, transfer of heat toward the protective cover 40 of the housing case 3 from the shielding member 5 via the shaft 73 can be reduced even more.

Herein, although the gaps D1 and D3 are formed in both the through-holes 52a and 46a of the first and second attachment portions 52 and 46, respectively, a gap may be formed in at least one of the through-hole 52a or 46a. Accordingly, transfer of heat toward the protective cover 40 of the housing case 3 from the portion where the gap is formed can be reduced even more.

Further, in the present embodiment, the gaps D1 and D3 are formed by setting the diameter of the shaft body 73a of the shaft 73 to a smaller value than the diameter of each of the through-holes 52a and 46a. Besides, for example, the gaps D1 and D3 may be formed by setting each of the diameters of the through-holes 52a and 46a to the same value as the diameter of the shaft body 73a of the shaft 73 and forming recesses in portions of the through-holes 52a and 46a in which the shaft body 73a is to be located.

Further, in the present embodiment, as a preferable configuration, as illustrated in FIG. 11, a gap D2 is formed between the planar portion 51 of the shielding member 5 and the housing case 3 in a state in which the shielding member 5 is attached to the protective cover 40 of the housing case 3. In addition, a gap D4 is also formed between the planar portion 51 of the shielding member 5 and the guide member 6 (see FIG. 8). It should be noted that in the present embodiment, the gap D2 is formed as the planar portion 51 of the shielding member 5 abuts a part of the protective cover 40 in a state in which the shielding member 5 is attached to the protective cover 40 of the housing case 3. Accordingly, the attached state of the shielding member 5 is stabilized. However, the gap D2 may also be formed such that the planar portion 51 of the shielding member 5 and the protective cover 40 are made completely apart from each other due to the positional relationship between an elastic member 75 described below and the shaft 73.

A space between the planar portion 51 of the shielding member 5 and the protective cover 40 is heat-insulated due to the gap D2 formed between the planar portion 51 of the shielding member 5 and the protective cover 40 (or the housing case 3). Further, a space between the planar portion 51 of the shielding member 5 and the guide member 6 is heat-insulated due to the gap D4 formed between the planar portion 51 of the shielding member 5 and the guide member 6. In this manner, radiation heat that is input to the shielding member 5 becomes less likely to be transferred directly to the case body 30 of the housing case 3 from the shielding member 5, and also becomes less likely to be transferred indirectly thereto via the guide member 6.

Herein, the sizes and positions of the shaft 73 and the through-holes 52a and 46a may be determined so that the gaps D2 and D4 are formed. In the present embodiment, the gaps D2 and D4 are formed stably using the elastic member 75 described below.

Specifically, the housing case 3 has attached thereto an elastic member 75, which urges the shielding member 5 toward the side where the work pieces W are to be welded together, in a state in which the shielding member 5 is attached to the housing case 3 (or the protective cover 40 thereof). More specifically, the elastic member 75 is a bent metal plate member and is attached to the second attachment portion 46 of the protective cover 40 forming the housing case 3.

The elastic member 75 contacts the shielding member 5 at a bent portion 75a, which is bent in a manner projecting toward the shielding member 5, so that the elastically deformed state of the elastic member 75 is retained and the shielding member 5 is urged with the restoring force of the elastic member 75. In the present embodiment, the gap D2 is formed between the housing case 3 and the planar portion 51 of the shielding member 5 and the gap D4 is formed between the guide member 6 and the planar portion 51 of the shielding member 5 in a state in which the shielding member 5 is urged by the elastic member 75. Due to the gaps D2 and D4, heat becomes less likely to be transferred to the housing case 3 from the shielding member 5. In addition, since the shielding member is elastically urged by the elastic member 75 in a state in which such gaps are formed, the elastic member 75 functions as a shock absorbing member. Therefore, damage to the shielding member 5 can be suppressed. Further, since the shielding member 5 contacts the bent portion 75a of the elastic member 75, the area of contact between the shielding member 5 and the elastic member 75 can be reduced, and thus, heat becomes less likely to be transferred to the housing case 3 from the shielding member 5 via the elastic member 75.

Further, since the gaps D2 and D4 are formed as the shielding member 5 is urged by the elastic member 75, even after an external force acts on the shielding member 5 and the gaps D2 and D4 are thus squashed, for example, the gaps D2 and D4 can be formed again with the restoring force (i.e., urging force) of the elastic member 75. In particular, when the gaps D1 and D3 are formed between the shaft 73 and the through-holes 52a and 46a of the first and second attachment portions 52 and 46, respectively, the gaps D1 and D3 between the shaft 73 and the through-holes 52a and 46a can be held stably. The elastic member 75 may be an elastic body, such as rubber or resin, for example, as long as it can urge the shielding member 5 as described above.

Herein, when the shielding member 5 is made of a ceramic material, which is a brittle material, the shielding member 5 is likely to have defects, such as fractures, generated therein when subjected to an impact load, for example. However, in the present embodiment, the shielding member 5 is elastically urged by the elastic member 75 in a state in which the gaps D1 to D4 are formed. Accordingly, since the elastic member 75 functions as a shock absorbing member against an impact load that would act on the shielding member, damage to the shielding member 5 can be suppressed.

As described above, the state in which the gap D2 is formed between the planar portion 51 of the shielding member 5 and the housing case 3 (or the protective cover 40 thereof) may be either a state in which the planar portion 51 of the shielding member 5 and the housing case 3 are totally without contact with each other or a state in which they are partly in contact with each other. In the present embodiment, as a more preferable configuration, as illustrated in FIG. 11, an end 51c, which is on the side away from the work pieces W. of the planar portion 51 is in contact with the protective cover 40 while the gap D2 is formed between the planar portion 51 of the shielding member 5 and the protective cover 40 in a state in which the shielding member 5 is attached to the protective cover 40 of the housing case 3. Accordingly, since the end 51c, which is on the side away from the work pieces W, of the planar portion 51 is in contact with the protective cover 40 while the gap D2 is secured, the shielding member 5 can be stably attached to the protective cover 40 and heat becomes less likely to be transferred to the protective cover 40 from the shielding member 5.

In such a state, the protective cover 40 has formed therein the second gas flow channel 47 for passing a gas therethrough as described above, and the second gas flow channel 47 has formed therein a plurality of fins extending in one direction. Accordingly, heat transferred to the protective cover 40 from the shielding member 5 is radiated by the plurality of fins 47m formed in the second gas flow channel 47. The heat radiated by the fins 47m is discharged with the gas flowing through the second gas flow channel 47. Consequently, a temperature rise of the protective cover 40 can be suppressed and the sensor unit 2 becomes less likely to be heated.

In particular, in the present embodiment, as a more preferable configuration, the end 51c of the planar portion 51 abuts the front face 40a of the protective cover 40. Since the second gas flow channel 47 is formed so that a gas flows from the front face 40a side to the rear face 40b side of the protective cover 40, heat from the end 51c of the planar portion 51 in contact with the front face 40a of the protective cover 40 can be radiated efficiently. Further, since the fins 47m formed in the second gas flow channel 47 also extend from the front face 40a side at which the temperature is higher of the protective cover 40 toward the rear face 40b side at which the temperature is lower, heat transferred to the fins 47m can be radiated more efficiently.

In the present embodiment, the shielding member 5 is inclined with respect to the flow direction of the gas that passes through the outlet port 48b for detection so that the gas discharged from the outlet port 48b for detection is blown to the shielding member 5 and thus flows to the side opposite to the side where the work pieces W are to be welded together. The gas moving straight along the flow direction from the outlet port 48b for detection collides with the rear face 51b of the planar portion 51 of the inclined shielding member 5. Accordingly, since the gas discharged from the outlet port 48b for detection is blown to the shielding member 5, the shielding member 5 can be cooled with the gas. Further, since the gas blown to the shielding member 5 flows to the side opposite to the side where the work pieces W are to be welded together, the gas becomes less likely to flow to the side where the work pieces W are to be welded together. Accordingly, the influence of the gas (or a flow thereof) discharged from the outlet port 48b for detection can be reduced in the portion where the work pieces are to be welded together, and thus, stable welding can be performed.

6. Regarding Guide Member 6

The sensor device 1 may further include the guide member 6. The guide member 6 extends to the side on which the laser beam L1 is projected so as to surround the protective cover together with the shielding member 5 (for example, see FIGS. 3 and 12). That is, the guide member 6 and the shielding member 5 form a nozzle that guides the gases discharged from the outlet ports (i.e., the outlet port 48a for laser beam projection and the outlet port 48b for detection) toward the side of the work pieces W on which the laser beam L1 is projected. The guide member 6 is made of a metallic material or a ceramic material. In the present embodiment, the guide member 6 is made of brass as a preferable material, for example. The guide member 6 made of brass can reflect infrared rays generated during welding. Since the guide member 6 surrounds the protective cover together with the shielding member 5, diffusion of the gases to the region around the protective cover 40 can be suppressed, and the gases can be guided to the side on which the laser beam L1 is projected (i.e., to the side where the work pieces are to be welded together). In addition, providing the guide member 6 can reduce the influence of noise generated from the side of the work pieces W on the sensor unit 2.

Figure 12:
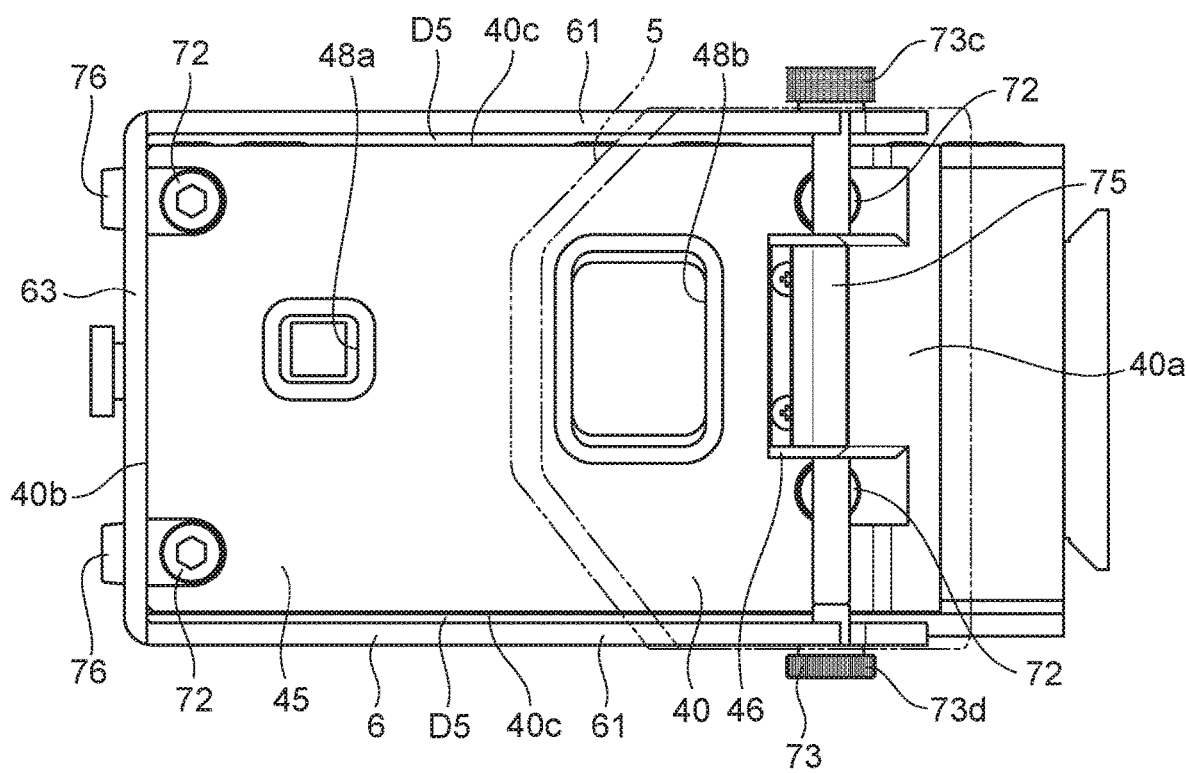
FIG. 12 is a bottom view of the sensor device for welding illustrated in FIG. 9 with the shielding member removed.

Further, in the present embodiment, as illustrated in FIG. 12, the guide member 6 is formed so as to surround the pair of lateral side faces 40c and 40c and the rear face 40b of the protective cover 40, and a gap D5 is formed between the guide member 6 and each lateral side face 40c.

More specifically, the guide member 6 includes a lateral plate portion 61 that is formed at a position facing each lateral side face 40c, and a rear plate portion 63 that is formed continuously with the lateral plate portion 61 at a position facing the rear face 40b. The aforementioned gap D5 is formed between the lateral side face 40c of the protective cover 40 and the lateral plate portion 61 of the guide member 6 that faces the lateral side face 40c. The rear plate portion 63 has formed therein a cutout portion 63a through which the cartridge 41 of the protective cover 40 is pulled out (see FIG. 3).

As described above, in the present embodiment, transfer of the radiation heat H, which is generated during welding and directed toward the protective cover 40 from the guide member 6, can be blocked by the gap D5 formed between the lateral side face 40c of the protective cover 40 and the lateral plate portion 61 of the guide member 6 that faces the lateral side face 40c (see FIG. 1). Further, due to the flows of the gases discharged from the outlet port 48a for laser beam projection and the outlet port 48b for detection, a region around the gap D5 is at a negative pressure. Accordingly, a gas (i.e., atmosphere) is sucked into the space surrounded by the guide member 6 and the shielding member 5 from a region near the side face of the case body 30 via the gap D5 formed between each lateral plate portion 61 of the guide member 6 and each lateral side face 40c of the protective cover 40. Due to the flow of the sucked gas, flows of the gases, which have been discharged from the outlet port 48a for laser beam projection and the outlet port 48b for detection, toward the outer side of the lateral side faces 40c of the protective cover 40 can be suppressed.

In the present embodiment, a rim 61a of the lateral plate portion 61 on the side where the work pieces W are to be welded together is inclined to become closer to the protective cover 40 in the direction toward the rear plate portion 63 from the side of the shielding member 5 (see FIG. 3). This allows the discharged gases to more easily flow to the side (i.e., rear side) opposite to the side where the work pieces W are to be welded together.

Further, the guide member 6 is attached at its rear plate portion 63 to the rear face 40b of the protective cover 40 via attachments 76, such as screws. Specifically, as illustrated in FIG. 11, the guide member 6 has formed therein slit portions 66 into which the shaft 73 is adapted to enter, and the shaft 73 is housed within the slit portions 66 formed in the guide member 6. When the guide member 6 is detached, the two attachments 76 and 76 are removed first so as to loosen the shaft body 73a and the screw body 73b fastened together. Next, pulling out the guide member 6 backward allows the shaft 73 to be pulled out of the slit portions 66 and thus allows the guide member 6 to be easily detached from the sensor device 1. Accordingly, the protective cover 40 can be inspected in a state in which the shielding member 5 is attached to the protective cover 40 and in a state in which the guide member 6 is detached from the protective cover 40.

In the present embodiment, transfer of the radiation heat H, which is generated during welding and directed toward the protective cover 40 from the guide member 6, can be blocked by the gap D5 formed between the lateral side face 40c of the protective cover 40 and the lateral plate portion 61 of the guide member 6 that faces the lateral side face 40c. In addition, since the attachments 76 are located on the side opposite to the side where the work pieces W are to be welded together, there is no possibility that the attachments 76 will be exposed directly to radiation heat generated during welding of the work pieces W. Consequently, even if the guide member is heated by the radiation heat, heating of the sensor unit 2 housed within the case body 30 via the protective cover 40 due to the heat can be reduced.

As described above, according to the present embodiment, excessive heating of the sensor unit 2 can be reduced by the shielding member 5 and each of the gaps D1 to D5. Accordingly, more stable measurement can be performed with the sensor unit 2.

7. Regarding Detachable Structure of Cartridge 41

Figure 13:
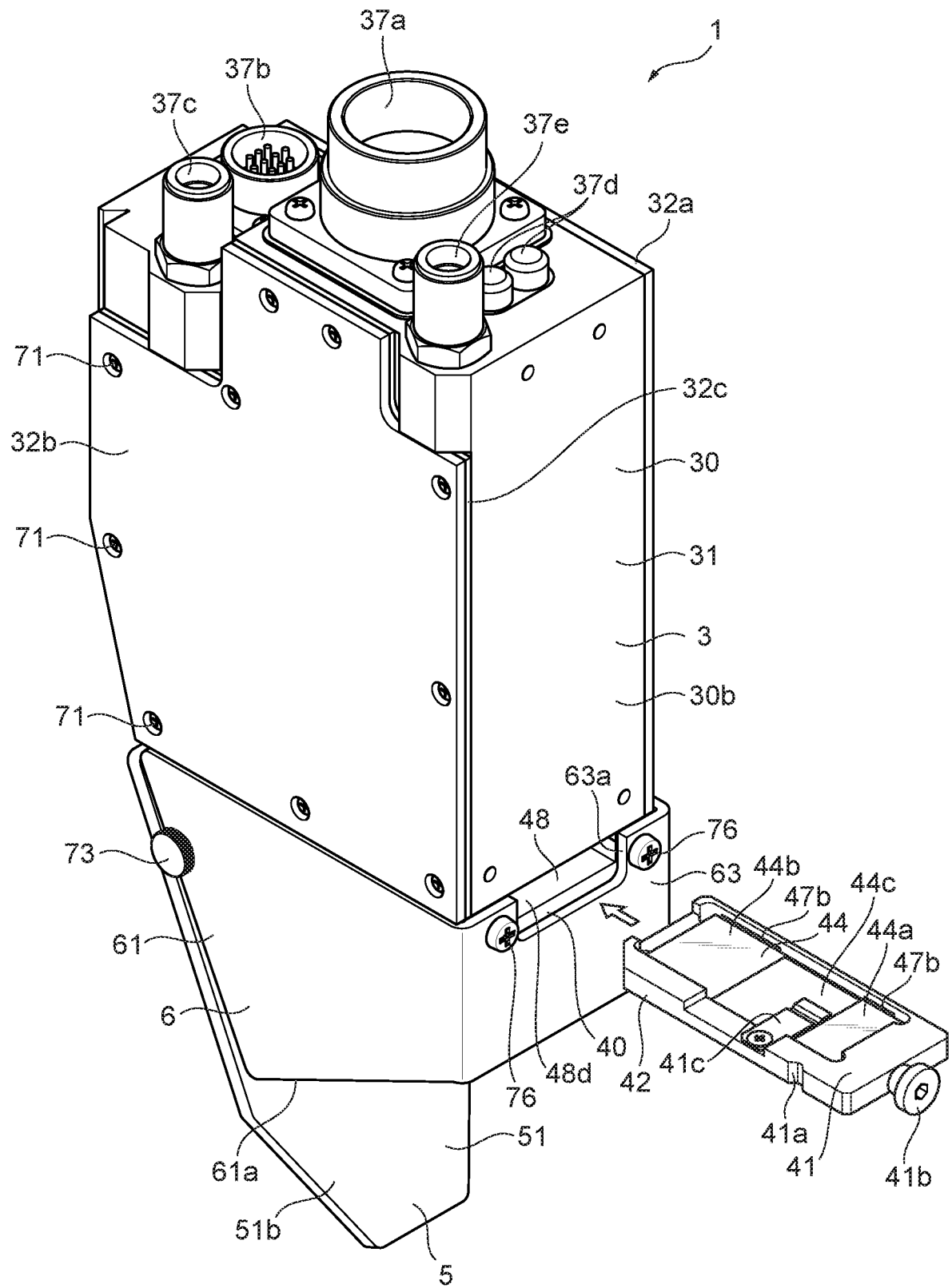
FIG. 13 is a schematic perspective view of the sensor device for welding illustrated in FIG. 3 with the cartridge removed.

As illustrated in FIGS. 6 and 13, the cartridge 41 detachably engages the holder 45 in a state in which the holder 45 is attached to the case body 30. Specifically, the cartridge 41 engages the holder 45 such that the cartridge 41 can be pulled out of the holder 45 by being slid on the holder 45 from the front face 40a side toward the rear face 40b side of the protective cover 40 while being held on the holder 45.

More specifically, as illustrated in FIG. 6, the holder body 45a has attached thereto the leaf spring 49 that is bent so as to form the projection 49a, and the projection 49a of the leaf spring 49 engages the recess 41a of the cartridge 41 so that the cartridge 41 can be held in the holder 45. Meanwhile, the cartridge 41 has the gripper 41b on the rear face side of the protective cover 40. When the cartridge 41 is pulled out of the holder 45 with the gripper 41b being gripped, the leaf spring 49 elastically deforms. Therefore, the recess 41a of the cartridge 41 and the projection 49a of the leaf spring 49 can be easily disengaged.

As described above, in the present embodiment, the cartridge 41 can be slid on the holder 45 from the front face 40a side of the protective cover 40 toward the rear face 40b side that is less likely to be heated during welding. Therefore, the cartridge 41 can be quickly pulled out of the holder 45 so as to replace the protective cover 40 without caring about heat that remains after the welding.

As illustrated in FIG. 13, in a state in which the holder 45 is attached to the case body 30, a housing recess 48 for housing the cartridge 41 is formed between the holder 45 and the case body 30, and the housing recess 48 has formed on its rear face side an insertion slot 48d through which the cartridge is inserted. It should be noted that in the present embodiment, the cartridge 41 preferably has an asymmetrical shape as seen in plan view, and the housing recess 48 is formed so as to correspond to such shape. Accordingly, when the cartridge 41 is housed within the housing recess 48 in an incorrect posture, such as an upside-down posture, the cartridge 41 cannot be inserted deep inside the housing recess 48. Accordingly, the cartridge 41 can be prevented from being inserted in an incorrect way.

Further, in the present embodiment, even when the cartridge 41 gets caught within the housing recess 48 when being pulled out of the device, detaching the holder 45 of the protective cover 40 from the case body 30 as illustrated in FIG. 4, for example, will allow the cartridge 41 to be exposed and thus allow the cartridge 41 to be easily detached. Further, it is possible to check if the cartridge 41 is inserted in the housing recess 48 from the rear face side where the insertion slot 48d is formed.

Figure 14:
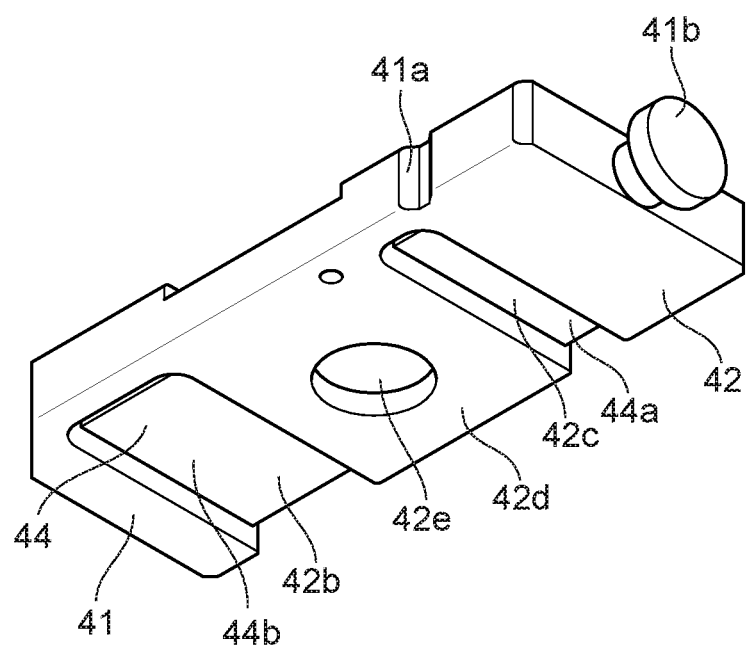
FIG. 14 is a schematic perspective view of the cartridge illustrated in FIG. 13 seen from its bottom side.

The cartridge 41 includes the protective plate 44 and the cartridge body 42, and the protective plate 44 is detachably held in the cartridge body 42 by the clip 41c. As illustrated in FIG. 14, the bottom 42d of the cartridge body 42 has formed therein a through-hole 42e. Accordingly, pushing up the protective plate 44 via the through-hole 42e with a finger allows the protective plate 44 to float off the cartridge body 42 and thus allows the protective plate 44 to be easily detached from the cartridge body 42. It should be noted that the cartridge body 42 has a cutout 42c for passing the projection laser beam L1, and a cutout 42b for passing the detection laser beam L2.

The protective plate 44 is preferably made of a transparent material that transmits the laser beams L1 and L2, and examples of such material include glass and resin. The protective plate 44 includes the protective portion 44a for laser beam projection that covers the pass-through portion 36a for laser beam projection, and the protective portion 44b for detection that covers the pass-through portion 36b for detection. Further, the visible portion 44c for checking if the protective plate 44 is present is formed in the protective plate 44, between the protective portions 44a and 44b in a state in which the protective plate 44 is held in the cartridge body 42 (see FIG. 15). In the present embodiment, the visible portion 44c may be a colored portion or be covered with an opaque material as long as an operator is able to check if the protective plate 44 is present.

In the present embodiment, as a preferable configuration, the visible portion 44c is a portion covered with a metal film made of a metallic material, such as aluminum foil. Providing the visible portion 44c makes it possible to easily check if the protective plate 44 is arranged in the cartridge 41. Therefore, an operator can be prevented from failing to put the protective plate 44 in the cartridge body 42.

In the present embodiment, in a state in which the cartridge 41 is loaded, the pass-through portion 36a for laser beam projection and the pass-through portion 36b for detection of the case body 30 are covered with the protective portion 44a for laser beam projection and the protective portion 44b for detection of the protective plate 44, respectively. Accordingly, entry of fume and the like, which are generated during welding, into the pass-through portion 36a for laser beam projection and the pass-through portion 36b for detection can be suppressed.

As described above, since the protective cover 40 is attached to the case body 30 so that the pass-through portion 36a for laser beam projection and the pass-through portion 36b for detection are covered with the protective plate 44 that transmits laser beams as illustrated in FIGS. 4 and 16A to 16C, for example, the pass-through portion 36a for laser beam projection and the pass-through portion 36b for detection can be protected by the protective plate 44.

In addition, as described above, the protective plate 44 is included in the cartridge 41, and the cartridge 41 is held in the holder 45 attached to the case body 30 while detachably engaging the holder 45. Therefore, detaching the cartridge 41, which has been attached to the case body 30, can easily replace the protective plate 44 together with the cartridge 41 and thus can improve the maintenance property of the device.

8. Regarding Detection Structure of Protective Cover

Figure 15:
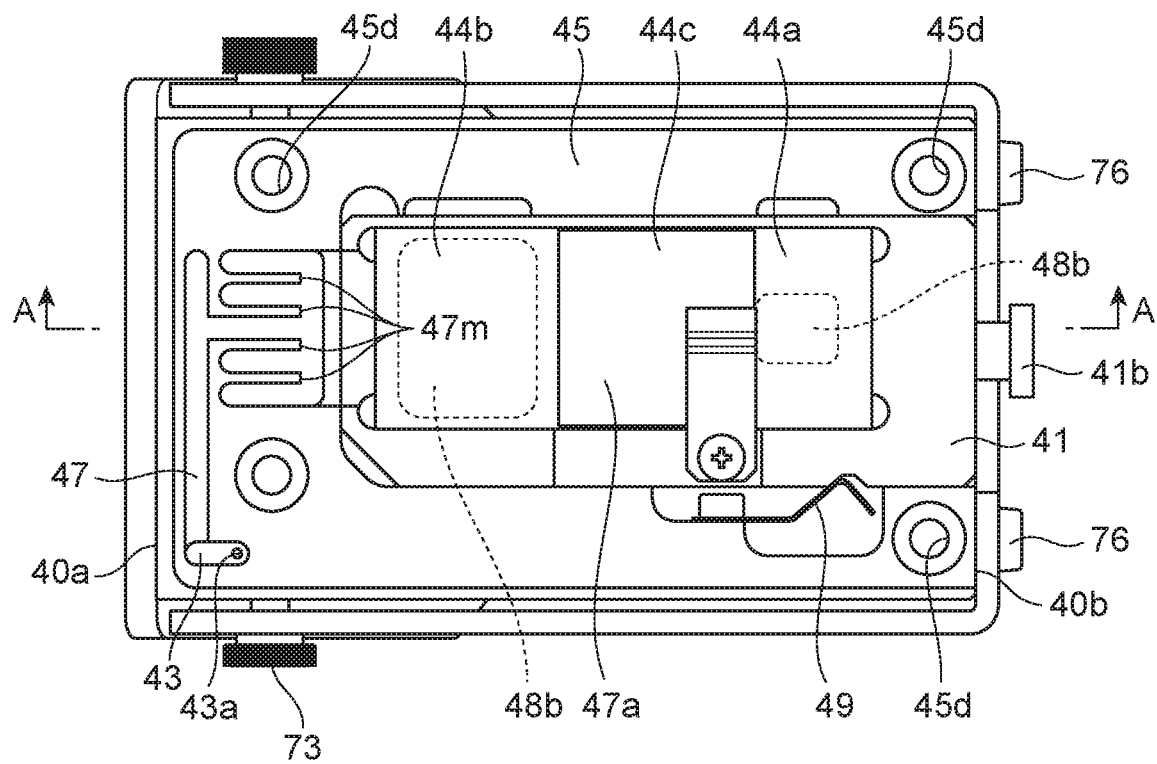
FIG. 15 is a schematic plan view of the sensor device for welding illustrated in FIG. 4 with the case body removed.

As describe above, in the present embodiment, the case body 30 has arranged therein the plate detection sensor 23 that detects the protective plate 44 in a state in which the cartridge 41 is held in the holder 45 (see FIGS. 1, 15, and 16A).

As illustrated in FIGS. 1 and 16A, the plate detection sensor 23 is a sensor that detects the presence or absence of the protective plate 44 by irradiating the visible portion 44c with a detection laser beam L and detecting the detection laser beam L reflected from the visible portion 44c. Therefore, the detection laser beam L emitted from the plate detection sensor 23 passes through the pass-through portion 36c of the case body 30 and irradiates the visible portion 44c. In the present embodiment, the visible portion 44c is a portion covered with a metal film made of a metallic material, such as aluminum foil, and thus reflects the detection laser beam L that has irradiated the visible portion 44c. Since the detection laser beam L reflected from the visible portion 44c is directed toward the plate detection sensor 23, the plate detection sensor 23 can detect the detection laser beam L. Accordingly, the plate detection sensor 23 can determine that the protective plate 44 is present. In this manner, since the visible portion 44c has two functions including visual check and detection, the device configuration can be simplified.

Herein, in the present embodiment, as a preferable configuration, the cartridge body 42 has formed therein the aforementioned through-hole 42e that passes an emitted detection laser beam L in a state in which the protective plate 44 is not held in the cartridge body 42 and is formed at a position covered with the visible portion in a state in which the protective plate 44 is held in the cartridge body 42 (for example, see FIGS. 14 and 16C). Further, the holder has an antireflective portion that prevents the detection laser beam L having passed through the through-hole 42e from being reflected toward the plate detection sensor 23. Herein, the antireflective portion may be, for example, a surface with minute irregularities that diffusely reflect the detection laser beam L, or a through-hole that passes the detection laser beam L, as long as it can prevent the aforementioned reflection. In the present embodiment, the antireflective portion is a conical recessed wall face 48c formed in the holder body 45a of the holder 45. Providing the recessed wall face 48c allows the detection laser beam L to be reflected in a direction not toward the plate detection sensor 23.

Figure 16B:
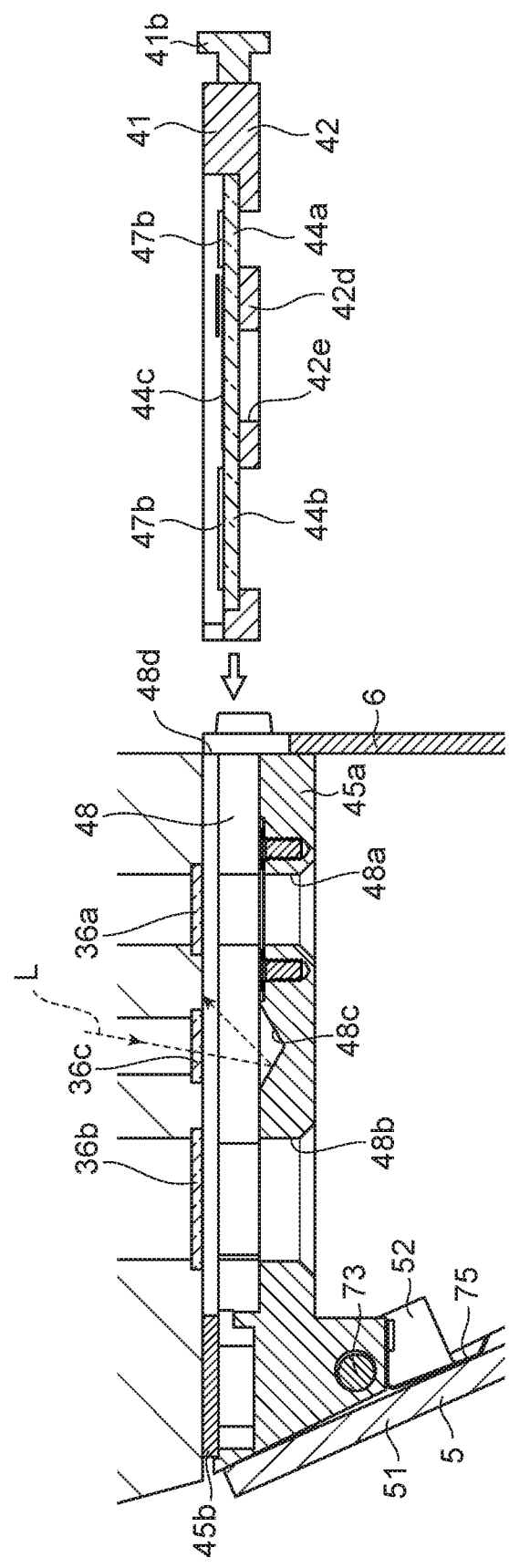
FIG. 16B is a cross-sectional view of the sensor device for welding illustrated in FIG. 16A with the cartridge removed.

In this manner, as illustrated in FIGS. 16B and 16C, when the cartridge 41 is detached, the detection laser beam L emitted from the plate detection sensor 23 passes through the pass-through portion 36c of the case body 30 and then irradiates the conical recessed wall face 48c of the holder 45. Accordingly, since the detection laser beam L having irradiated the recessed wall face 48c is not reflected toward the plate detection sensor 23, the detection laser beam L is not detected by the plate detection sensor 23. Consequently, the plate detection sensor 23 can determine (i.e., detect) the absence of the protective plate 44.

Similarly, as illustrated in FIG. 16C, even when the cartridge body 42 is inserted without the protective plate 44 held therein, the detection laser beam L emitted from the plate detection sensor 23 passes through the through-hole 42e of the cartridge body 42 and then irradiates the conical recessed wall face 48c of the holder 45. Accordingly, since the detection laser beam L having irradiated the recessed wall face 48c is not reflected toward the plate detection sensor 23, the detection laser beam L is not detected by the plate detection sensor 23. Consequently, the plate detection sensor 23 can determine (i.e., detect) the absence of the protective plate 44. In this manner, in the present embodiment, the absence of the protective plate 44 can be determined using the conical recessed wall face 48c of the holder 45 regardless of whether the cartridge body 42 is attached or not.

Although the embodiments of the present invention have been described in detail above, the present invention is not limited to thereto, and various design changes can be made without departing from the spirit or scope of the invention recited in the claims.

In the present embodiment, the sensor unit projects a laser beam onto work pieces and receives a laser beam reflected from the work pieces as a detection light beam so as to measure the states (i.e., shapes) of the work pieces and the distance from the detection unit to the work pieces. However, for example, the sensor unit may image a light beam reflected from the work pieces or a light beam emitted from the work pieces during welding as a detection light beam using an imaging device (i.e., camera) so as to detect the welded states of the work pieces, for example.

What is claimed is:

1. A sensor device for welding, comprising at least:
   a sensor unit configured to measure states of work pieces to be welded together or a distance to the work pieces; and
   a container including a housing case and a shielding member, the housing case being adapted to house the sensor unit, and the shielding member being adapted to shield radiation heat directed toward the housing case among radiation heat generated while the work pieces are welded together,
   wherein the shielding member is made of a material with lower thermal conductivity than that of the housing case,
   further wherein
      the shielding member is attached to the housing case,
      the shielding member has formed therein a planar portion and an attachment portion, the planar portion extending so as to shield the radiation heat, and the attachment portion being arranged on a rear face side of the planar portion that is opposite to a side where the work pieces are to be welded together and being adapted to attach the shielding member to the housing case, and
      the shielding member is attached on the rear face side of the planar portion to the housing case via the attachment portion, and
   further wherein
      provided that the attachment portion of the shielding member is a first attachment portion, the housing case has a second attachment portion on the rear face side of the planar portion, the second attachment portion being adapted to attach the shielding member to the housing case,
      each of the first attachment portion and the second attachment portion has a through-hole through which an attachment shaft is adapted to be inserted, and
      the shielding member is attached to the housing case as the shaft is inserted through the through-hole of the attachment portions and through-hole of the housing case.

2. The sensor device for welding according to claim 1, wherein a gap is formed between the planar portion of the shielding member and the housing case in a state in which the shielding member is attached to the housing case.

3. The sensor device for welding according to claim 1, wherein a gap is formed between the shaft and at least one of the through-hole of the first attachment portion or the through-hole of the second attachment portion.

4. The sensor device for welding according to claim 1, wherein:
   the housing case has attached thereto an elastic member, the elastic member being adapted to urge the shielding member toward a side where the work pieces are to be welded together in a state in which the shielding member is attached to the housing case, and
   the gap is formed between the housing case and the planar portion of the shielding member in a state in which the shielding member is urged by the elastic member.

5. The sensor device for welding according to claim 1, wherein the shielding member is made of a ceramic material.

6. The sensor device for welding according to claim 1, wherein:
   the sensor unit includes at least a detection unit configured to detect as a detection light beam a light beam from surfaces of the work pieces to be welded together,
   the housing case includes
      a case body adapted to house the sensor unit, the case body having formed therein at least one pass-through portion that passes the detection light beam directed toward the detection unit, and
      a protective cover including a protective plate that transmits the detection light beam, the protective cover being attached to the case body such that the protective plate covers the pass-through portion, and
   the shielding member is attached to the protective cover.

7. The sensor device for welding according to claim 6, wherein:
   in a state in which the shielding member is attached to the housing case, the gap is formed between the planar portion of the shielding member and the protective cover, and an end of the planar portion on a side away from the work pieces is in contact with the protective cover,
   the protective cover has formed therein a gas flow channel that passes a gas, and
   the gas flow channel has formed therein a plurality of fins extending in one direction.

8. The sensor device for welding according to claim 7, wherein:
   provided that a surface of the protective cover on the side where the work pieces are to be welded together with respect to the sensor device for welding is a front face of the protective cover, and a surface opposite to the front face is a rear face of the protective cover, the end of the planar portion abuts the front face of the protective cover, the gas flow channel is formed such that a gas flows from the front face side to the rear face side of the protective cover, and the fins extend from the front face side to the rear face side of the protective cover.

9. The sensor device for welding according to claim 6, wherein:

a spacer is arranged between the case body and the protective cover, and a material of the spacer has lower thermal conductivity than those of the case body and the protective cover.

10. The sensor device for welding according to claim 1, wherein:

the sensor unit includes at least a detection unit, the detection unit being configured to detect as a detection light beam a light beam from surfaces of the work pieces to be welded together, the sensor unit being configured to measure states of the work pieces or a distance from the detection unit to the work pieces using the detection light beam detected with the detection unit, the sensor device for welding further comprises:
   a case body adapted to house the sensor unit, the case body having formed therein at least one pass-through portion that passes the detection light beam directed toward the detection unit, and
   a protective cover including a protective plate that transmits the detection light beam, the protective cover being attached to the case body such that the protective plate covers the pass-through portion, the protective cover includes a cartridge and a holder, the cartridge including the protective plate, and the holder being adapted to hold the cartridge and be attached to the case body, and the cartridge detachably engages the holder in a state in which the holder is attached to the case body.

11. The sensor device for welding according to claim 10, wherein:

provided that a surface of the protective cover on a side where a welding device for welding the work pieces together is arranged with respect to the sensor device for welding is a front face of the protective cover, and a surface opposite to the front face is a rear face of the protective cover, the cartridge engages the holder so as to be able to be pulled out of the holder by being slid on the holder from the front face side toward the rear face side of the protective cover while being held on the holder.

12. The sensor device for welding according to claim 11, wherein:

in a state in which the holder is attached to the case body, a housing recess adapted to house the cartridge is formed between the holder and the case body, and the housing recess has on the rear face side an insertion slot through which the cartridge is adapted to be inserted.

13. The sensor device for welding according to claim 10, wherein:

the cartridge includes a cartridge body adapted to hold the protective plate, and the protective plate has formed therein a visible portion for visually checking if the protective plate is present in a state in which the protective plate is held in the cartridge body.

14. The sensor device for welding according to claim 13, wherein the case body has arranged therein a plate detection sensor, the plate detection sensor being configured to detect the protective plate in a state in which the cartridge is held in the holder.

15. The sensor device for welding according to claim 14, wherein:

the visible portion is a portion of the protective plate covered with a metallic material, and the plate detection sensor is configured to detect the visible portion.

16. The sensor device for welding according to claim 15, wherein:

the plate detection sensor is configured to detect if the protective plate is present by irradiating the visible portion with a detection laser beam and detecting the detection laser beam reflected from the visible portion, the cartridge body has formed therein a through-hole, the through-hole being adapted to pass the detection laser beam emitted by the plate detection sensor in a state in which the protective plate is not held in the cartridge body, and being formed at a position covered with the visible portion in a state in which the protective plate is held in the cartridge body, and the holder has an antireflective portion, the antireflective portion being adapted to prevent the detection laser beam having passed through the through-hole from being reflected toward the plate detection sensor.

* * * * *